United States Patent
White et al.

(10) Patent No.: US 10,759,475 B2
(45) Date of Patent: Sep. 1, 2020

(54) SELF-STEERING AXLE KNUCKLE

(71) Applicant: Hendrickson USA, L.L.C., Itasca, IL (US)

(72) Inventors: Jay D. White, Massillon, OH (US); Daniel W. Martin, II, Canton, OH (US); Keith M. Ernenwein, North Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 171 days.

(21) Appl. No.: 16/010,751

(22) Filed: Jun. 18, 2018

(65) Prior Publication Data

US 2018/0370565 A1 Dec. 27, 2018

Related U.S. Application Data

(60) Provisional application No. 62/522,900, filed on Jun. 21, 2017.

(51) Int. Cl.
*B62D 7/18* (2006.01)
*B60T 1/06* (2006.01)
(Continued)

(52) U.S. Cl.
CPC .............. *B62D 7/18* (2013.01); *B60B 35/003* (2013.01); *B60B 35/025* (2013.01); *B60B 35/04* (2013.01);
(Continued)

(58) Field of Classification Search
CPC .. B60B 35/003; B60B 2310/3025; B62D 7/18
See application file for complete search history.

(56) References Cited

U.S. PATENT DOCUMENTS 3,908,480 A * 9/1975 Afanador ................. B62D 7/18
74/511 R
4,002,286 A * 1/1977 Simon ..................... B23P 13/00
228/174
(Continued)

FOREIGN PATENT DOCUMENTS

CN 103407490 A 11/2013
DE 19733158 A1 2/1998
(Continued)

*Primary Examiner* — James A English
(74) *Attorney, Agent, or Firm* — Dureska & Moore, LLC; David P. Dureska; Greg Strugalski

(57) ABSTRACT

Self-steering axle assembly has an axle with central tube having a longitudinal central axis. A king pin is connected with an end portion of the axle. A knuckle is connected with the king pin. The knuckle includes a torque plate section. A first arm of the knuckle extends from a side of the torque plate section and receives a first end portion of the king pin. A second arm extends from the torque plate section in the same direction as the first arm. The second arm receives a second end portion of the king pin. A spindle is friction welded to the torque plate section and has a longitudinal central axis. The torque plate section has at least one surface on the torque plate section extending substantially perpendicular to the longitudinal central axis of the spindle. A tool engages the surface during friction welding of the spindle to the torque plate section. The relative locations of the axle, spindle and king pin enable an air disc brake actuator to avoid contact with components of the heavy-duty vehicle during steering and with the ground and debris.

14 Claims, 20 Drawing Sheets

(51) Int. Cl.

| | |
|---|---|
| *B60B 35/04* | (2006.01) |
| *B62D 7/08* | (2006.01) |
| *B62D 7/20* | (2006.01) |
| *B62D 7/16* | (2006.01) |
| *B60G 9/00* | (2006.01) |
| *B60B 35/02* | (2006.01) |
| *B60G 11/26* | (2006.01) |
| *B60T 17/08* | (2006.01) |
| *B60B 35/00* | (2006.01) |
| *F16D 55/00* | (2006.01) |

(52) U.S. Cl.
CPC .............. *B60G 9/003* (2013.01); *B60G 11/26* (2013.01); *B60T 1/065* (2013.01); *B60T 17/088* (2013.01); *B62D 7/08* (2013.01); *B62D 7/166* (2013.01); *B62D 7/20* (2013.01); *B60B 2310/3025* (2013.01); *B60G 2200/31* (2013.01); *B60G 2200/445* (2013.01); *B60G 2206/012* (2013.01); *B60G 2206/50* (2013.01); *B60Y 2200/142* (2013.01); *B60Y 2200/147* (2013.01); *B60Y 2200/148* (2013.01); *F16D 2055/0008* (2013.01)

(56) References Cited

U.S. PATENT DOCUMENTS

| | | | |
|---|---|---|---|
| 5,269,546 A | 12/1993 | Pollock et al. | |
| 6,419,250 B1 * | 7/2002 | Pollock | B21K 1/74 |
| | | | 280/93.512 |
| 6,776,425 B2 | 8/2004 | Britton | |
| 6,902,176 B2 | 6/2005 | Gottschalk | |
| 7,360,773 B2 | 4/2008 | Gottschalk | |
| 7,568,710 B2 | 8/2009 | Ramsey | |
| 7,585,032 B2 * | 9/2009 | Seeds | B60B 35/003 |
| | | | 301/124.1 |
| 7,748,724 B2 | 7/2010 | Gottschalk | |
| 7,766,349 B2 | 8/2010 | Gottschalk | |
| 8,070,177 B2 * | 12/2011 | Eveley | B62D 7/18 |
| | | | 280/124.116 |
| 8,967,639 B2 | 3/2015 | Conaway et al. | |
| 2003/0062701 A1 * | 4/2003 | Davis | B62D 7/18 |
| | | | 280/93.512 |
| 2004/0004335 A1 * | 1/2004 | Rudder | B60G 11/181 |
| | | | 280/86.751 |
| 2010/0025951 A1 * | 2/2010 | Buchwald | B62D 7/18 |
| | | | 280/93.512 |
| 2011/0175434 A1 | 7/2011 | MacKarvich et al. | |
| 2013/0062396 A1 * | 3/2013 | Davenport | B23K 20/129 |
| | | | 228/102 |
| 2014/0042722 A1 * | 2/2014 | Lam | B62D 7/18 |
| | | | 280/93.512 |
| 2015/0266507 A1 | 9/2015 | Westnedge et al. | |
| 2018/0066720 A1 * | 3/2018 | Dilworth | F16D 65/0056 |
| 2018/0273091 A1 * | 9/2018 | Lam | B62D 7/18 |

FOREIGN PATENT DOCUMENTS

| | | |
|---|---|---|
| DE | 102005029539 A1 | 12/2006 |
| DE | 102006024622 A1 | 11/2007 |
| DE | 102006031708 A1 | 1/2008 |
| DE | 102013112290 A1 | 5/2015 |
| WO | 2016153988 A1 | 9/2016 |

* cited by examiner

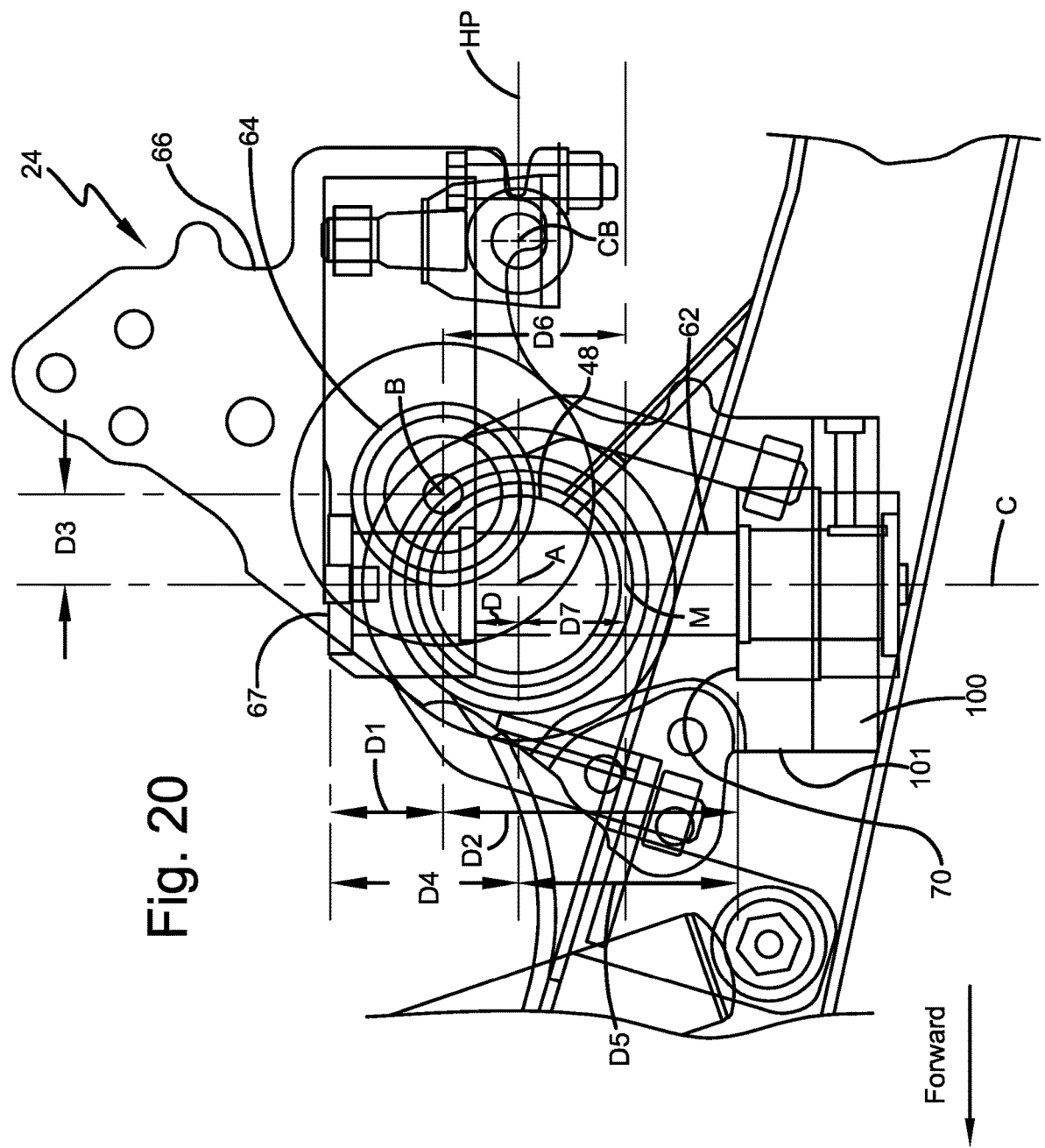

SELF-STEERING AXLE KNUCKLE

CROSS-REFERENCE TO RELATED APPLICATIONS

This application claims the benefit of U.S. Provisional Patent Application Ser. No. 62/522,900 filed on Jun. 21, 2017.

TECHNICAL FIELD

The subject disclosure relates to a self-steering axle/suspension system for a heavy-duty vehicle. Particularly, the subject disclosure relates to an axle knuckle for a self-steering axle/suspension system.

BACKGROUND

In wheeled vehicle axle/suspension systems for heavy-duty vehicles, it is often desirable to have a lifting feature that raises an axle so tires do not engage a ground or road surface when extra load carrying capabilities are not needed or when the heavy-duty vehicle is being backed-up. The axle is typically in a lifted position when operating the heavy-duty wheeled vehicle in a lightly loaded or empty condition or being backed-up. The axle is lowered when the heavy-duty wheeled vehicle has a gross vehicle weight that requires an extra axle to conform to weight per axle standards, to avoid accelerated tire wear and avoid abnormal load conditions on the axle/suspension system. It is known that when the heavy-duty wheeled vehicle is moving forward, the drag of the tires will cause the axle to steer automatically or "self-steer" in response to turning of the heavy-duty vehicle. This is referred to as a self-steering axle/suspension system. Heavy-duty wheeled vehicles include trucks, trailers, tractor-trailers or semi-trailers, and the tractor-trailers or semi-trailers may be equipped with one or more trailers. There are some jurisdictions that have requirements for operating heavy-duty wheeled vehicles on highways and roadways. These requirements include provisions that heavy-duty wheeled vehicles operate on the highways and roadways in a manner that does not adversely impact infrastructure. Self-steering axle/suspension systems are often used to comply with these requirements.

Self-steering axle/suspension systems for heavy-duty wheeled vehicles are known. The known self-steering axle/suspension systems distribute the gross vehicle weight carried by axles of a heavy-duty wheeled vehicle when a self-steering axle of the self-steering axle/suspension system is in a down or operating position so tires associated with that self-steering axle engage a ground or road surface. When the self-steering axle is in the down or operating position with the tires in contact with a ground or road surface, the self-steering feature provides a mechanism in which the tires may better follow the path of travel while the heavy-duty wheeled vehicle is turning and still help carrying the load of the heavy-duty vehicle. When the heavy-duty wheeled vehicle has little or no load, the self-steering axle can be lifted so the tires do not contact the ground or a road surface.

Self-steering axle/suspension systems, particularly in the medium and heavy-duty truck and semi-trailer industry, are currently popular. The self-steering axle/suspension systems rely on the drag of the tires as the vehicle proceeds in the forward direction to effect self-steering automatically in response to turning of the vehicle. Typical of self-steering axle/suspension systems are those referred to as "trailing" arm suspension systems found on trucks and semi-trailers and include knuckles that enable pivotal movement of an axle spindle relative to an axle central tube. The self-steering axle/suspension systems may be of the liftable or non-liftable type.

Self-steering axle/suspension systems often include air actuated disc brake systems. The air actuated disc brake systems include air operated actuators or brake chambers that are generally mounted behind and below the axle. This location typically prevents the brake chamber from contacting frame members of the heavy-duty vehicle and/or a component of an axle/suspension system. However, such positioning of the actuator or brake chamber exposes it to potential damage by being hit by road debris or even by contacting the ground or road surface over which the heavy-duty vehicle operates. Further limitations, disadvantages and drawbacks associated with the previously known self-steering axle/suspension systems include air actuated disc brake systems are that they have relatively large and relatively heavy upper king pin mounting bosses on knuckles, have relatively large offsets of the king pin from the axle spindle centerline in the direction of movement or travel of the heavy-duty vehicle and positioning the longitudinal mid-point of the king pin in substantially a centered vertical position relative to the axle spindle centerline.

The limitations, disadvantages and drawbacks associated with the prior art self-steering axle/suspension systems incorporating air disc brake systems make it desirable to develop an improved self-steering axle/suspension system for use on a heavy-duty vehicle. The self-steering axle/suspension system of the subject disclosure satisfies the need and overcomes the limitations, disadvantages and drawbacks by including a new and improved knuckle. The new and improved knuckle locates the brake chamber in a position that protects it from potential damage from road debris and ground contact, has an air disc brake actuator that avoids contact with parts of the heavy-duty vehicle during pivotal movement of the knuckle, has relatively smaller offsets of the king pin from the axle spindle centerline and positions the longitudinal mid-point of the king pin vertically below the axle spindle centerline.

SUMMARY

A summary is provided to introduce concepts of the subject disclosure in a form that are described in detail below. This summary is not intended to identify key factors or essential features of the subject disclosure, nor is it intended to be used to limit the scope of the subject disclosure.

A self-steering axle/suspension system for a heavy-duty vehicle includes a self-steering axle assembly with an air disc brake system and an improved knuckle, according to one aspect of the subject disclosure. The heavy-duty vehicle has frame members. A pair of transversely spaced hangers are mounted on and depend from the frame members of the heavy-duty vehicle. Each of a pair of transversely spaced apart trailing arm beams are pivotally connected at a first end portion to a respective hanger. Each of a pair of transversely spaced air springs are mounted between the frame members and an opposite second end portion of a trailing arm beam. A tubular axle has a central tube with a longitudinal central axis and is supported by the trailing arm beams intermediate the first and second end portions. A king pin is connected with an end portion of the axle.

The knuckle is connected with the king pin and pivotal about the king pin. The knuckle includes a torque plate section. A first arm extends in a direction substantially perpendicular from an inboard side of the torque plate section. The first arm has an opening for receiving a first end portion of the king pin. A second arm extends in a direction substantially perpendicular from the torque plate section in the same direction that the first arm extends. The second arm has an opening coaxially aligned with the opening in the first arm for receiving an opposite second end portion of the king pin. An axle spindle or spindle having a longitudinal central axis is friction welded to, and extends from, an outboard side of the torque plate section. The torque plate section has at least one surface on the inboard side of the torque plate section that extends substantially perpendicular to the longitudinal central axis of the spindle. The surface of the torque plate section is engaged by a tool during friction welding the spindle to the torque plate section.

The self-steering axle system also includes an actuator of the air disc brake system mounted to the knuckle between the axle and frame members of the heavy-duty vehicle and extending inboard from the knuckle. A relief is formed in a respective hanger of the heavy-duty vehicle to avoid contact of the air disc brake system actuator with a hanger during pivotal movement of the knuckle. The relief in the hanger is positioned and sized to avoid contact by the air disc brake system actuator during pivotal movement of the spindle up to about 30° in either direction relative to the longitudinal central axis of the axle. The air disc brake system actuator also avoids contact with the axle and/or an air spring during pivotal movement up to about 30° in either direction.

The torque plate section may be made by forging. The torque plate section also has tie rod attachment structure. The first arm, the second arm and the tie rod attachment structure are integrally formed as one piece with the torque plate section by forging.

The torque plate section may be formed from a steel plate. A first arm is integrally formed with the torque plate section by bending the steel plate. A second arm is formed separately from the torque plate section on a separate block. The block is attachable to the torque plate section. An annular groove is formed in the outboard side of the torque plate section adjacent the spindle location.

Tie rod attachment structure extends from the torque plate section in the same direction as the first and second arms. If the torque plate section is formed by forging, the first arm, the second arm and the tie rod attachment structure are integrally formed as one piece with the torque plate section during forging. If the torque plate section is formed from a steel plate, the tie rod attachment structure is supported by the block. A center of a ball of the tie rod end is located the same distance from the first arm in a direction parallel to the longitudinal central axis of the king pin as the longitudinal central axis of the axle is located from the first arm when wheels associated with the axle are in substantially straight-ahead or non-steered positions.

The longitudinal central axis of the spindle is located closer to the second arm than to the first arm. An axially outward facing surface of the second arm is spaced from the longitudinal central axis of the axle by at least about 2.68 inches. The longitudinal central axis of the king pin is spaced from the longitudinal central axis of the spindle in a direction of forward travel of the heavy-duty vehicle by no more than about 2.5 inches. An axially inwards facing end surface of the second arm is located closer to the longitudinal central axis of the axle than to an axially inwards facing end surface of the first arm or a component of the first arm. The longitudinal central axis of the central tube of the axle is spaced from the longitudinal central axis of the spindle in a direction of forward travel of the heavy-duty vehicle at least by about 0.25 inch.

The king pin is cylindrical with a longitudinal central axis. The longitudinal central axis of the king pin is located along the longitudinal central axis of the axle. The longitudinal central axis of the king pin is spaced a distance from the centerline of the spindle in a forward direction.

The limitations, disadvantages and drawbacks associated with the prior self-steering axles are overcome with the self-steering axle knuckle constructed and manufactured according to aspects of the subject disclosure. The concepts of the subject disclosure provide a self-steering axle knuckle for a heavy-duty vehicle that positions an air disc brake actuator to minimize potential damage from road debris and to avoid engagement with components of the heavy-duty vehicle.

DRAWINGS

The following description and drawings set forth certain illustrative aspects and implementations of the subject disclosure. These are indicative of but a few of the various ways in which one or more aspects or implementations may be employed. Further features of the subject disclosure will become apparent to those skilled in the art from reading the following description with reference to the accompanying drawings, in which:

FIG. 20 is a fragmentary side view of the knuckle, illustrated in FIGS. 1, 2, 10, 11, showing position relationships of a torque plate section, spindle, king pin and axle, that are common to all aspects.

DESCRIPTION

Figure 1:
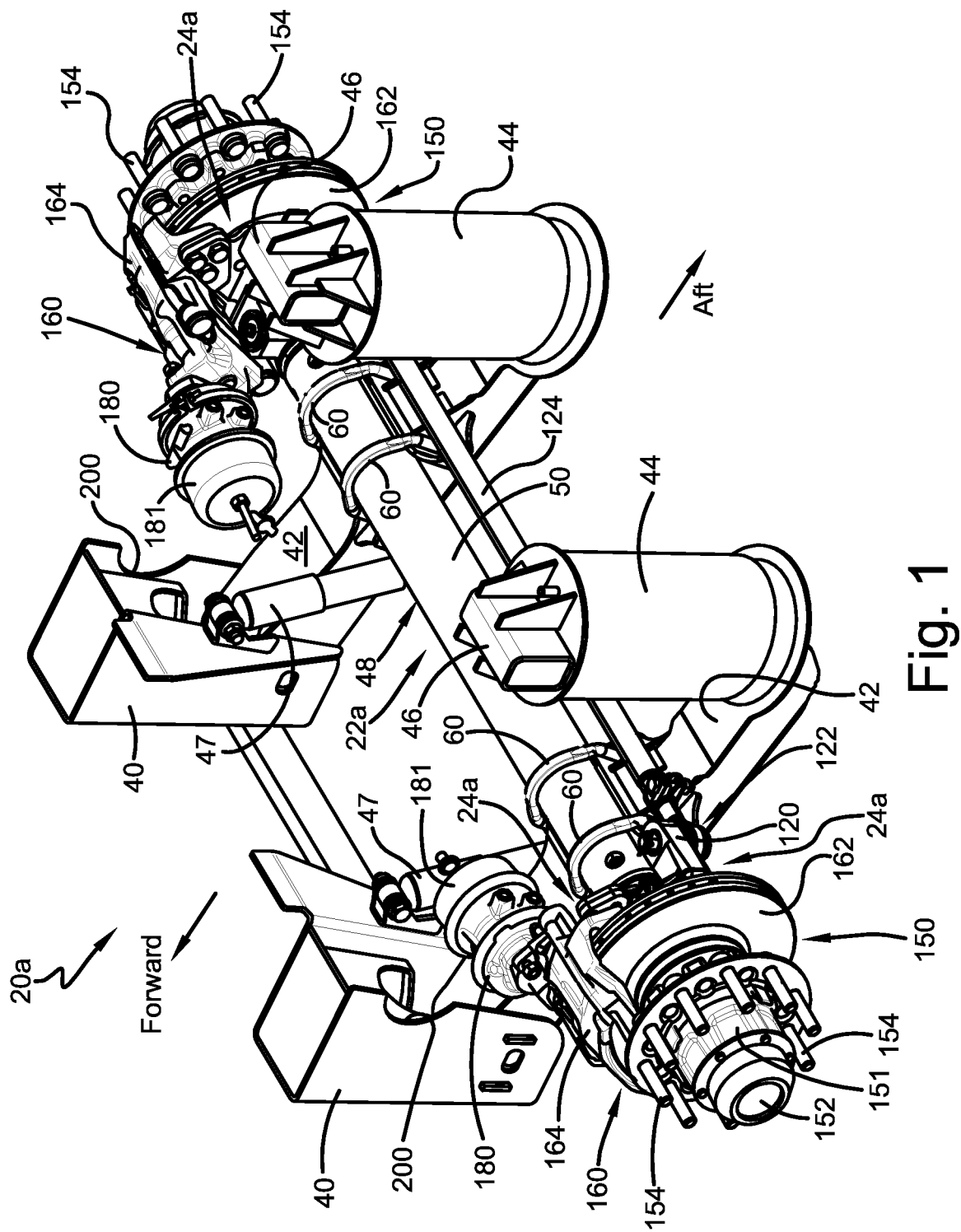
FIG. 1 is an overall top perspective view of a self-steering axle system incorporating a knuckle constructed according to an aspect of the subject disclosure.

The subject disclosure is described with reference to the drawings, in which like reference identifiers are used to refer to like elements throughout. For exemplary purposes, details are set forth in order to provide an understanding of the concepts in the subject disclosure. It will be understood, however, that the subject disclosure can be practiced and implemented without these specific details. Certain terms are used for brevity, clarity and understanding, but no unnecessary limitations are to be implied and are intended to be broadly construed.

Heavy-duty vehicles (not shown) include trucks, trailers, tractor-trailers or semi-trailers, and the like. The tractor-trailers or semi-trailers may be equipped with one or more trailers. Reference shall be made generally to a heavy-duty vehicle for the purpose of convenience, with the understanding that such reference includes trucks, trailers, tractor-trailers and semi-trailers, and the like.

Self-steering axle/suspension systems 20a (FIGS. 1-2) and 20b (FIGS. 10-11), according to aspects of the subject disclosure, for a heavy-duty vehicle are used to distribute the load carried by the heavy-duty vehicle to a ground or road surface. The load is distributed when an axle assembly 22a or 22b of the respective self-steering axle/suspension system 20a or 20b is in a down or operating position with its associated tires in contact with the ground or the road surface. When the heavy-duty vehicle has little or no load or when the heavy-duty vehicle is being backed-up, the axle assembly 22a or 22b may be lifted so the tires associated with the axle do not contact the ground or the road surface. Raising and lowering of the axle assemblies 22a and 22b may be accomplished by a known lift mechanism (not shown).

The heavy-duty vehicle may have more than one self-steering axle/suspension system 20a, 20b. By way of example, the heavy-duty vehicle will be described as having a single self-steering axle/suspension system 20a, 20b, but it will be apparent that the heavy-duty vehicle may include more than one, as is known.

The self-steering axle/suspension systems 20a and 20b are essentially identical in structure and function except for respective knuckles 24a (best seen in FIGS. 2-8) and 24b (best seen in FIGS. 11-12 and 15-18). There are many components in common with the self-steering axle/suspension systems 20a and 20b and will be described here as being employable in either of the self-steering axle/suspension systems and referred to by the same reference identifier.

With respect to the axle assembly 22a, the majority of the components positioned on one side of the heavy-duty vehicle will have correspondingly similarly mirrored components positioned on the other side. Accordingly, in this description, when reference is made to a particular axle or suspension component, it will be understood that a similar component may be present on the opposite side of the heavy-duty vehicle, unless otherwise apparent or stated.

The heavy-duty vehicle typically includes frame members (not shown) extending substantially parallel and longitudinally in a direction of forward movement of the heavy-duty vehicle. A pair of transversely spaced hangers 40 (FIG. 1) are mounted on and depend from the frame members. Each of a pair of transversely spaced apart trailing arm beams 42 are pivotally connected at a foreword or first end portion to connect to a respective hanger 40 by a known bushing assembly (not shown), which typically includes a bushing, pivot bolts and washers.

Each of a pair of transversely spaced air springs 44 are operatively mounted between a respective one of transversely extending frame members 46 at an opposite rearward or second end portion of a respective trailing arm beam 42. The air springs 44 provide suspension, and may provide damping, for the axle assembly 22a of the heavy-duty vehicle. Each one of a pair of shock absorbers 47 may extend between and be mounted to a respective one of the trailing arm beams 42 and a respective one of the hangers 40 or any suitable frame member.

Figure 8:
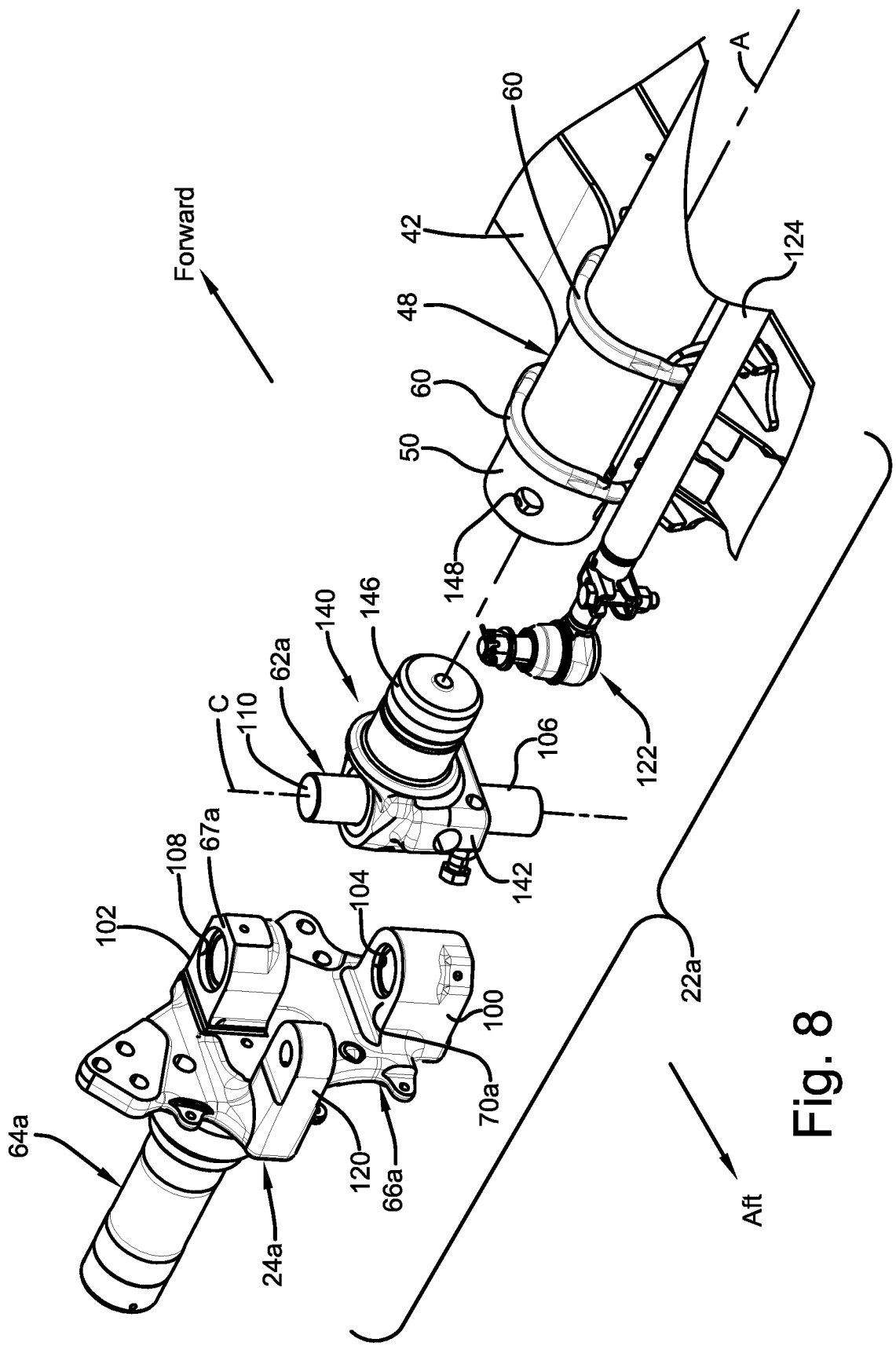
FIG. 8 is an exploded perspective view of a portion of the self-steering axle illustrated in FIG. 2, taken from the inboard side.

The axle assembly 22a also includes an axle 48 with a longitudinal central axis A (FIG. 8). The axle 48 has a central tube 50 and is connected to the trailing arm beams 42 by any suitable attachment arrangement, such as U-bolts 60 and/or attachment welds for the underslung type of axle arrangement that is illustrated. The axle 48 is typically mounted to the trailing arm beam 42 between the hanger 40 and the air spring 44. The axle 48 is pivotal relative to the hangers 40 by the trailing arm beams 42.

A king pin 62a (FIG. 8) is connectable with a respective end portion of the axle 48 and has a longitudinal central axis C. The longitudinal central axis C of the king pin 62a extends transversely relative to the longitudinal central axis A of the axle 48. The knuckle 24a receives a lower, as viewed in FIG. 8, or first portion 106 and an upper or second portion 110 of the king pin 62a. The knuckle 24a is pivotal about the respective king pin 62a in forward and aft directions.

The knuckle 24a includes a spindle 64a (FIGS. 3-8) extending in an outboard direction from the axle 48. The spindle 64a has a skirt or inboard end portion 65a. The spindle 64a has a longitudinal central axis B (FIGS. 3 and 5-6) which extends substantially parallel to the longitudinal central axis A of the axle 48 when the self-steering axle system has the vehicle tires in a straight ahead or loaded non-turning condition. The spindle 64a may pivot about the king pin 62a in either direction relative to the longitudinal central axis A of the axle 48 of up to about 30°.

The knuckle 24a also includes a body or torque plate section 66a to which the spindle 64a is fixed by suitable means, such as welding. The spindle 64a may be friction welded to an outboard side of the torque plate section 66a. The torque plate section 66a may have a protrusion 68a (FIGS. 3 and 6) extending from the outboard side of the torque plate section. The protrusion 68a has an outboard end portion 69a that is sized to have inner and outer diameters substantially the same as the respective inner and outer diameters of the end portion 65a of the spindle 64a.

The torque plate section 66a has at least one manufacturing aid surface 80a (FIG. 4) on an inboard side of the torque plate section that is axially opposite the protrusion

Figure 3:
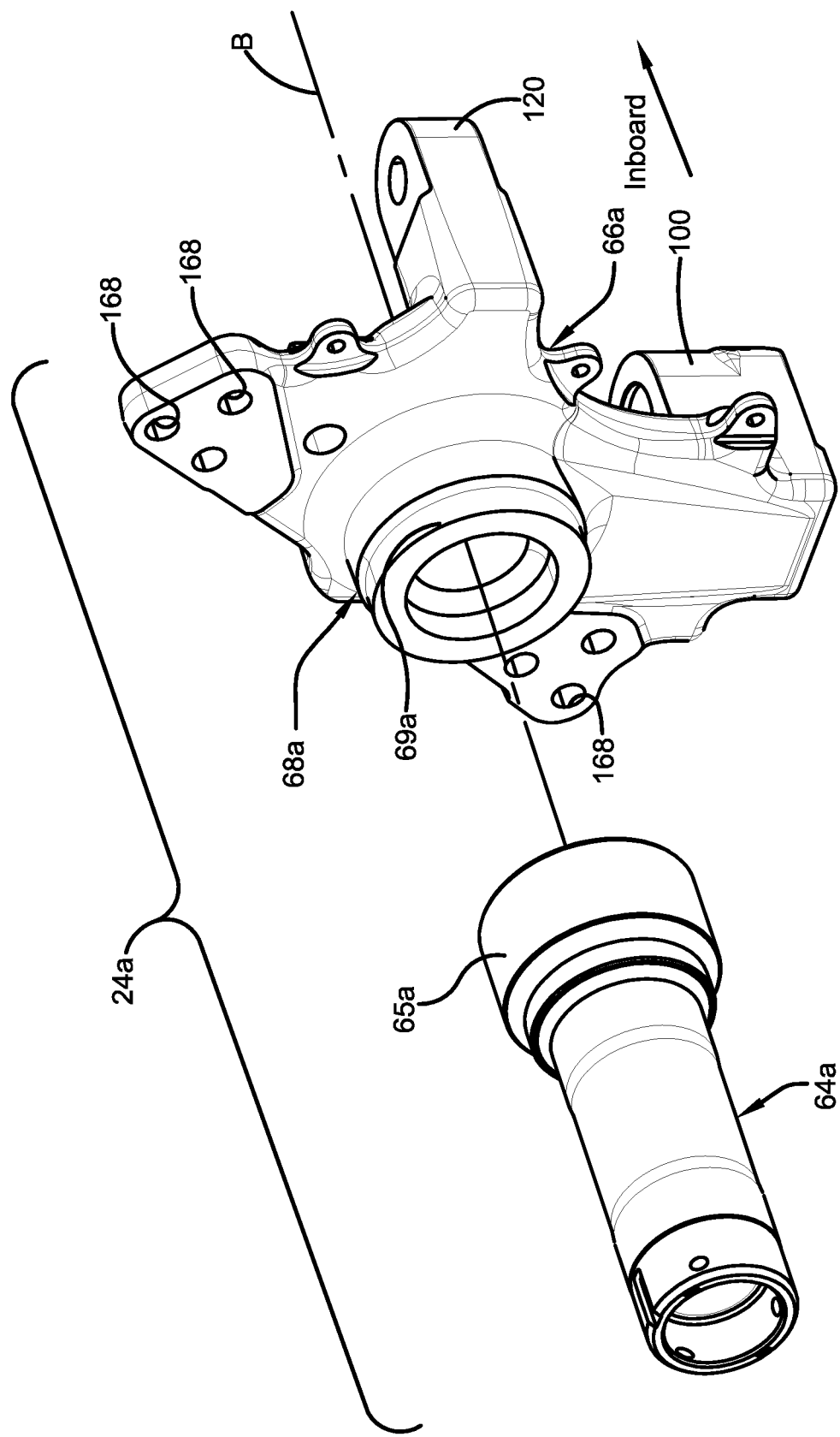
FIG. 3 is an exploded outboard perspective view of the knuckle used in the self-steering axle illustrated in FIGS. 1-2.
Figure 4:
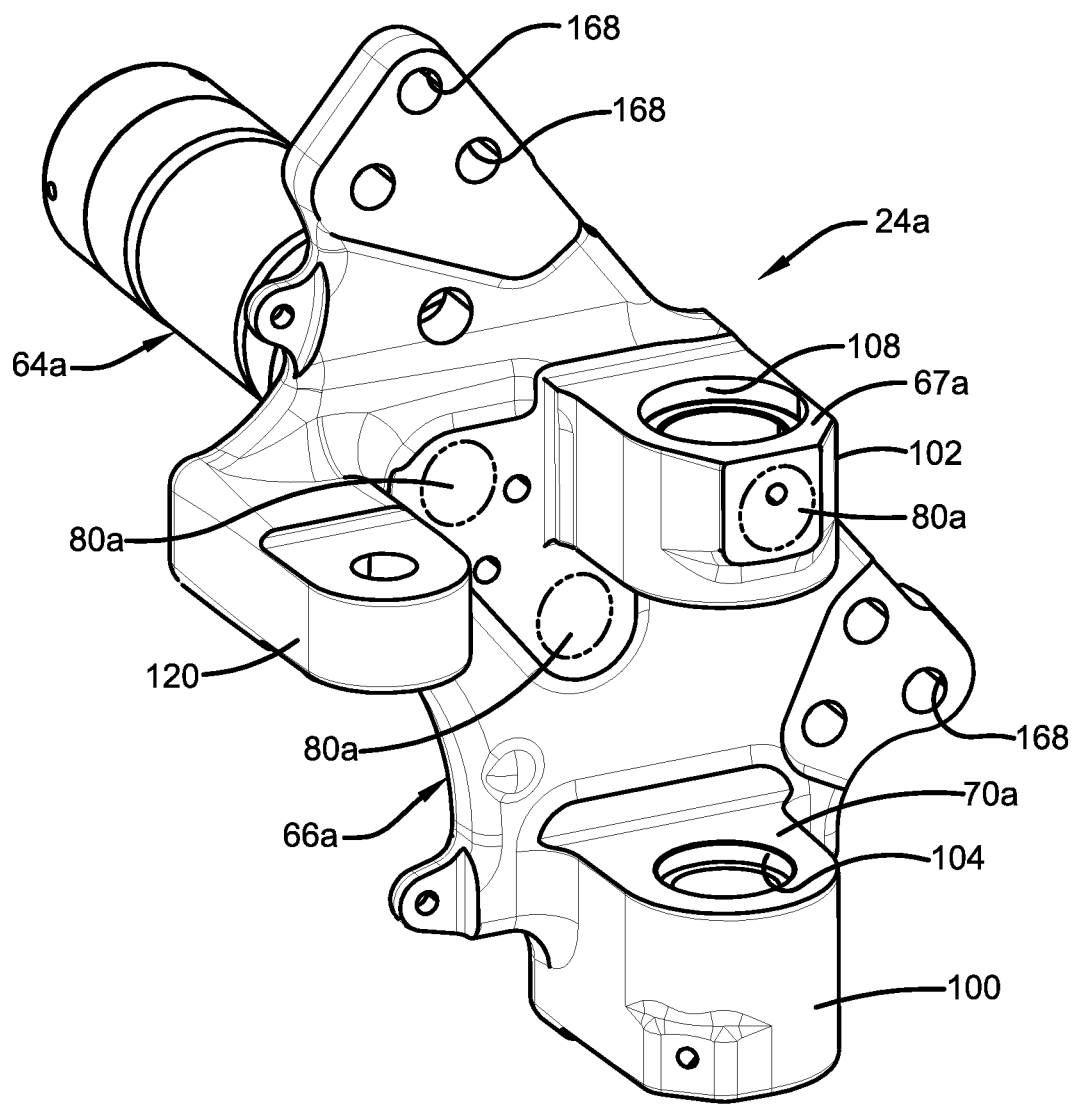
FIG. 4 is a perspective view of the knuckle, illustrated in FIGS. 1-2, and viewed from an inboard side.
Figure 5:
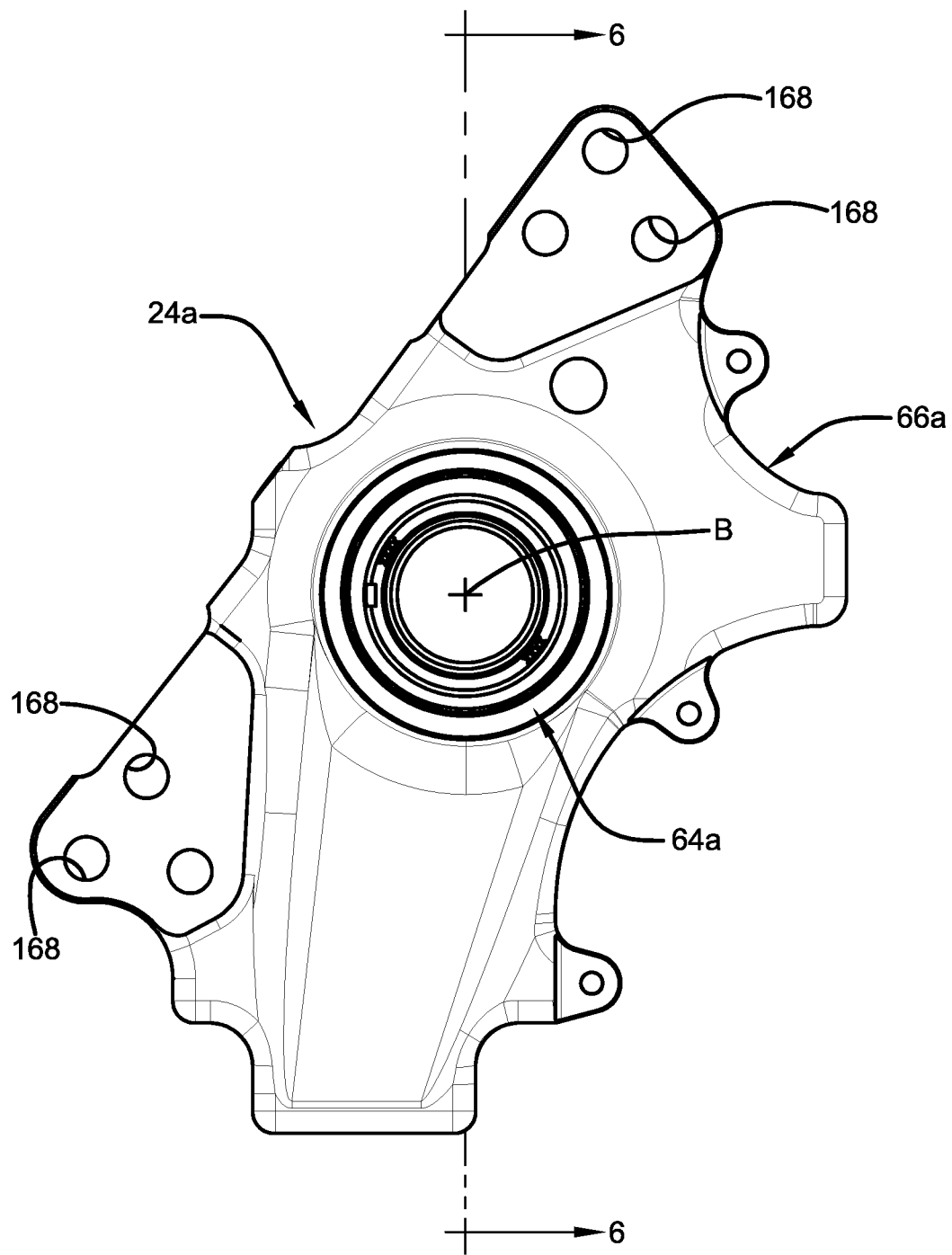
FIG. 5 is an elevational view of the knuckle illustrated in FIG. 3 taken from an outboard side of the knuckle.

68*a*. The manufacturing aid surface 80*a* engages a tool during a friction welding operation to rigidly connect the spindle to the torque plate section. The surfaces comprising the manufacturing aid surface 80*a* may have any suitable shape. The circular surfaces making up the manufacturing aid surface 80*a* are arranged in a pattern on the inboard side of the torque plate section 66*a* to substantially match the size of the protrusion 68*a* on the outboard side of the torque plate section, as illustrated in FIG. 3. The manufacturing aid surface 80*a* of the torque plate section 66*a* preferably has at least one planar surface that extends substantially perpendicular to the longitudinal central axis B of the spindle. It should be apparent that two or more axially offset manufacturing aid surfaces 80*a* may be employed without detracting from the concept of the subject disclosure. During manufacturing, the torque plate section 66*a* may use precision machined holes, such as one or more of the openings 168 (FIGS. 3-5 and 7), to assist in aligning the protrusion 68*a* with the spindle 64*a*.

Figure 6:
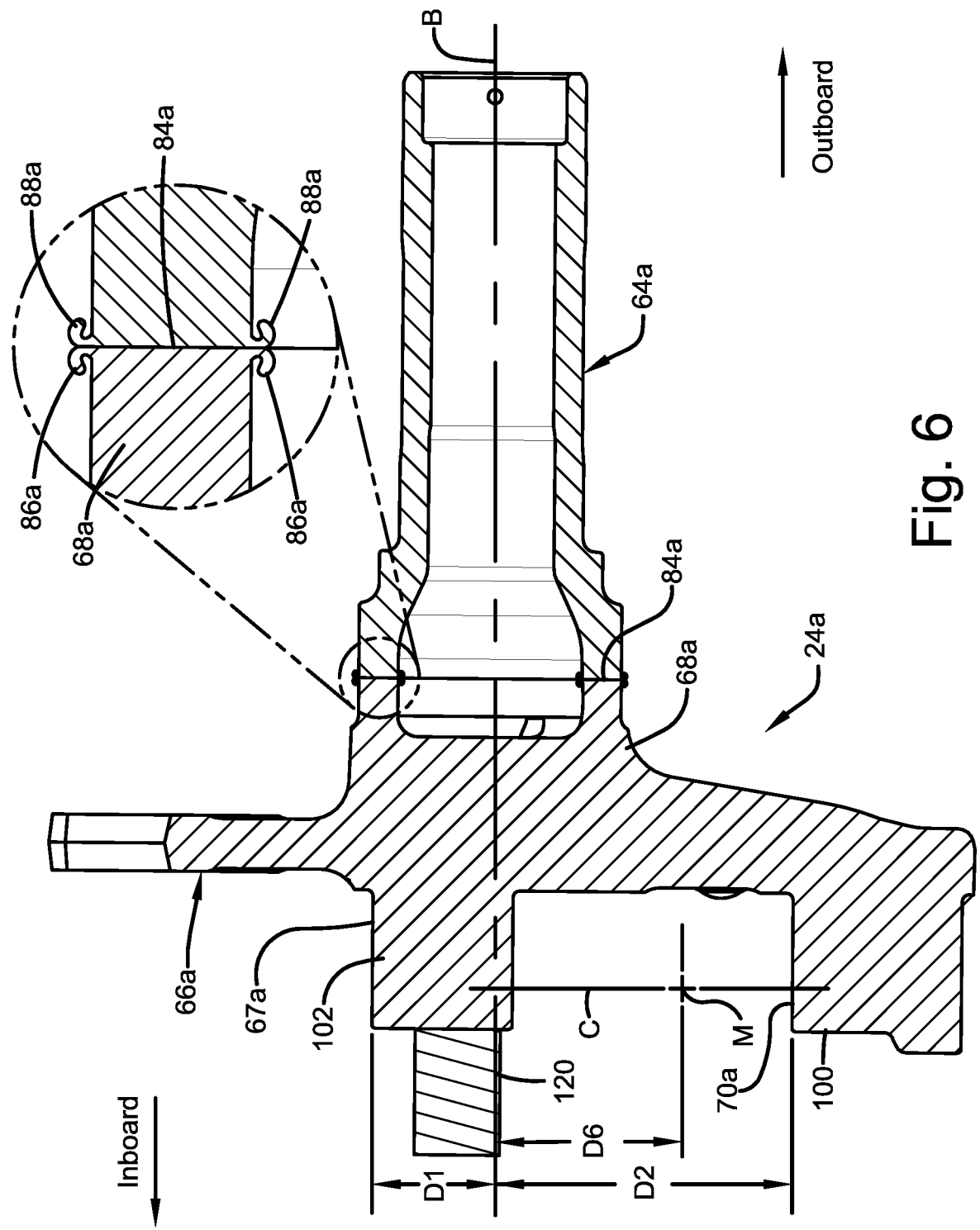
FIG. 6 is a cross-sectional view of the knuckle illustrated in FIG. 5 taken approximately along line 6-6 in FIG. 5, including a greatly enlarged portion of a weld joint.
Figure 7:
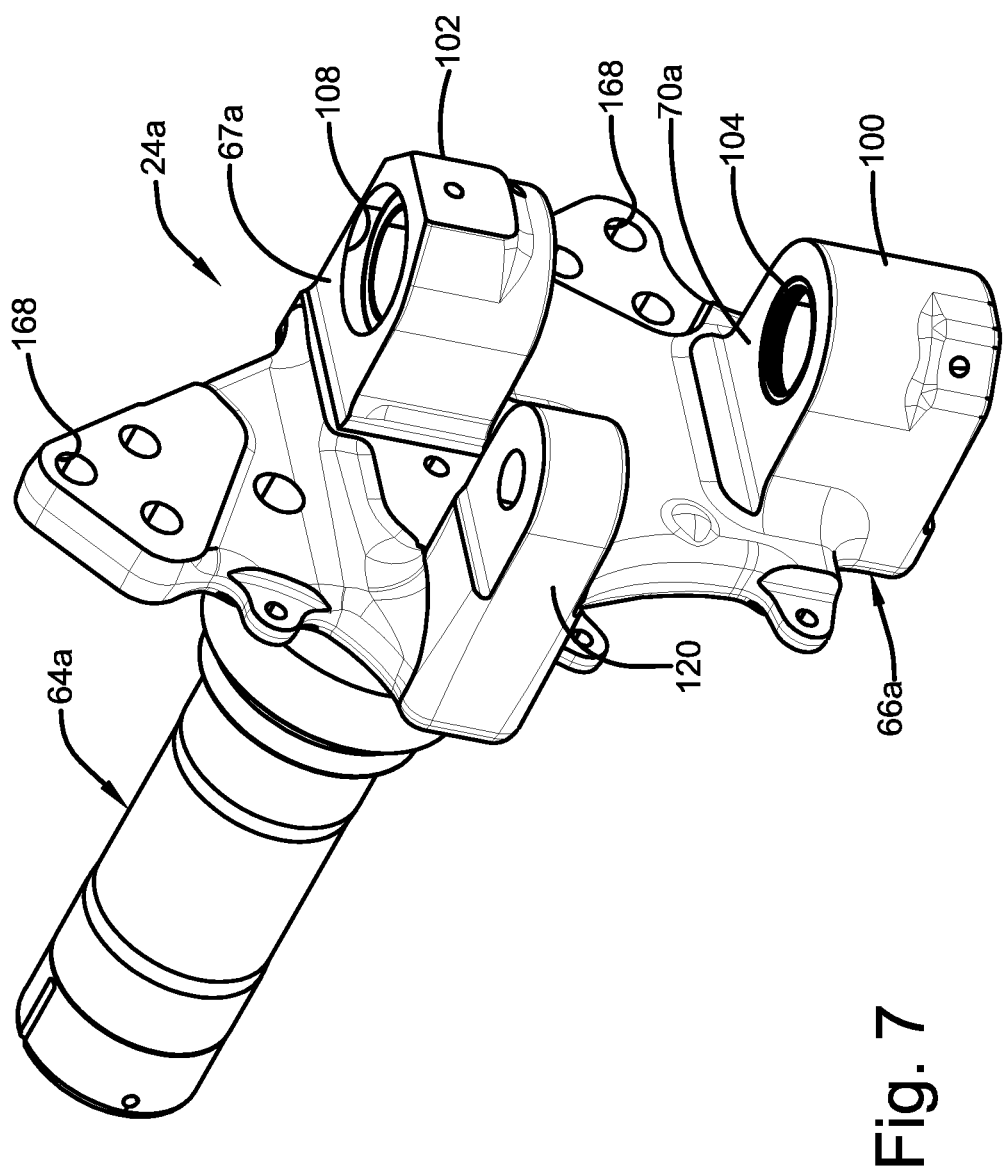
FIG. 7 is a perspective view of the knuckle, similar to FIG. 4, taken from an inboard side.

As illustrated in FIG. 6, the protrusion 68*a* allows a weld site 84*a* of the friction welding process to have good shape and relatively even weld curls 86*a* on the protrusion and weld curls 88*a* on the spindle 64*a*. The weld curls 86*a* and 88*a* at the weld site 84*a* that are located on the outer periphery of the spindle 64*a* may be machined away. The weld curls 86*a* and 88*a* at the weld site 84*a* on the inner periphery do not interfere with the operation or impact the strength and longevity of the knuckle 24*a* or spindle 64*a* and are left in place.

The torque plate section 66*a* may be made by forging according to one aspect of the subject disclosure. A lower, as viewed in FIGS. 3-4 and 6-8, or first arm 100 and an upper or second arm 102 extending in the same inboard direction from the torque plate section 66*a* are integrally formed as one-piece with the torque plate section during the forging operation. The first arm 100 forms a boss with an opening 104 (FIG. 7) for receiving the lower or first end portion 106 of the king pin 62*a*. The second arm 102 forms another boss with an opening 108 that is coaxially aligned with the opening 104 in the first arm 100 for receiving the upper or second end portion 110 of the king pin 62*a*. A cap 111*a* (FIG. 2) may seal the upper end of the opening 108 in the boss of the second arm 102 to protect the king pin 62*a* and knuckle 24*a* from contaminants from the environment in which the heavy-duty vehicle operates. An upper or outermost surface of the cap 111*a* may be substantially flush with an upper surface 67*a* of the second arm or spaced slightly from the end of the opening 108.

A longitudinal mid-point M along axis C of the king pin 62*a* is spaced from the axis B of the spindle 64*a* by a distance D6 of at least about 1.3", more preferably in the range from about 1.37" to about 4.41" and most preferably about 3.42". A longitudinal mid-point M along axis C of the king pin 62*a* is spaced from the axis A of the axle 48 by a distance D7 (FIG. 20) of at least about 0.0", more preferably in the range from about 0.11" to about 2.93" and most preferably about 1,92". The longitudinal central axis A of the spindle 64*a* is located closer to the second arm 102 than to the first arm 100 or the boss 101 mounted in the first arm. The axially outward facing or upper end surface 67*a* of the second arm 102 is spaced from the longitudinal central axis A of the axle 48 by a distance D4 at least about 2.68", more preferably in the range from about 2.68" to about 5.72" and most preferably about 3.7". The longitudinal central axis C of the king pin 62*a* is spaced from the longitudinal central axis B of the spindle 64*a* in a direction of forward travel of the heavy-duty vehicle by a distance D3 no more than about 2.5 inches. An axially inward facing end surface of the second arm 102 is located a relatively smaller distance D from the longitudinal central axis A of the central tube 50 of the axle 48 than a distance D5 that an axially inward facing end surface 70*a* of the first arm 100 is located relative to the longitudinal central axis of the axle.

A third arm or tie rod attachment structure 120 extends inboard from the torque plate section 66*a*. The tie rod attachment structure 120 is also formed integrally as one-piece with the torque plate section 66*a* during the forging operation. The tie rod attachment structure 120 supports a tie rod end 122 of tie rod 124 at a ball and socket arrangement in the tie rod end. The center of the ball CB (FIG. 20) of the tie rod end 122 and a longitudinal central axis of the tie rod 124 are located within a horizontal plane HP (FIG. 20) that contains the longitudinal central axis A of the axle 48 when the wheels and tires of the heavy-duty vehicle are in the straight-ahead or non-steered positions.

Figure 9:
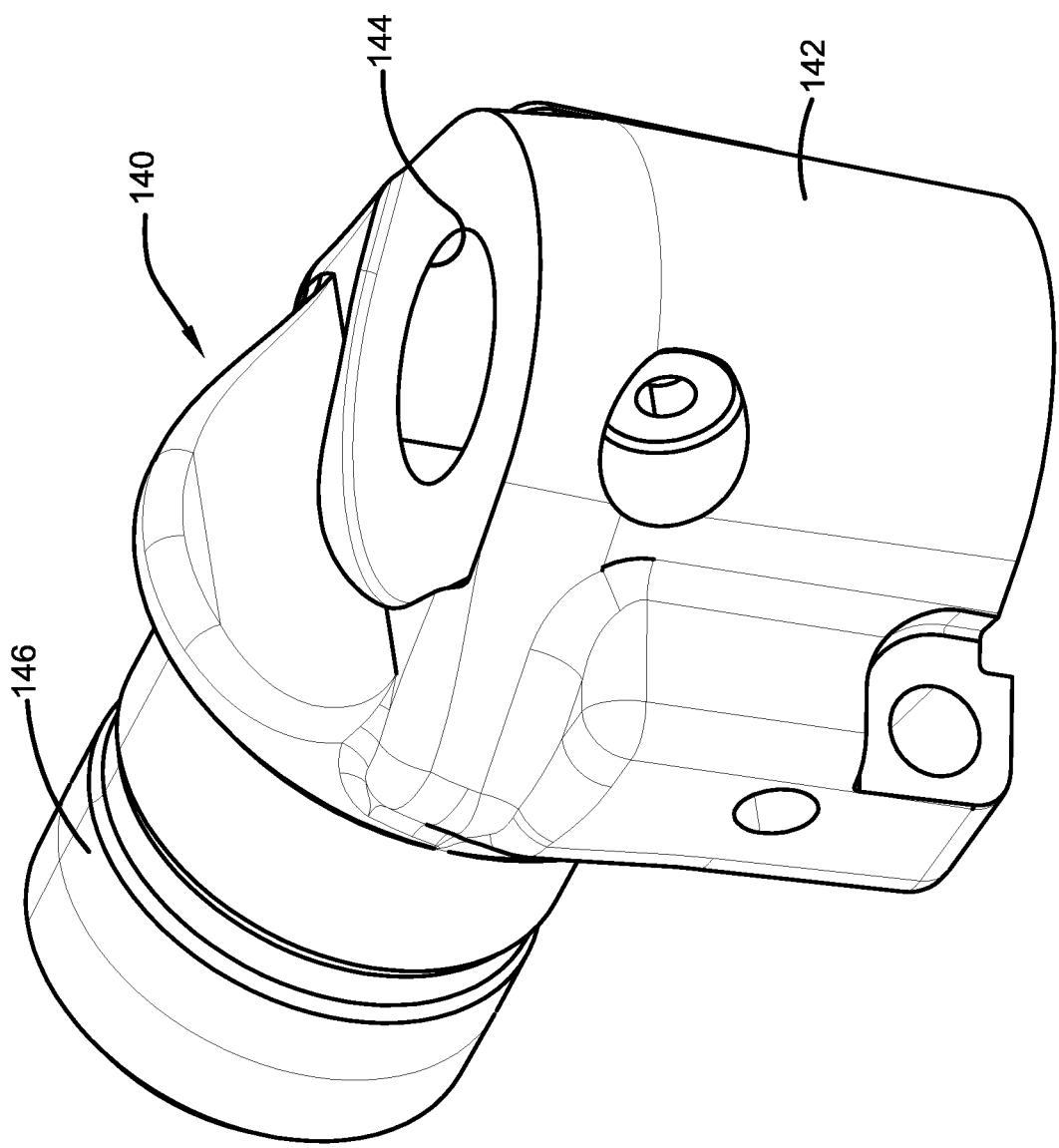
FIG. 9 is an enlarged perspective view of an axle end piece illustrated in FIG. 8, taken from an outboard side.

The king pin 62*a* is attached to a respective end portion of the central tube 50 by an axle end piece 140 (FIGS. 8-9). The axle end piece 140 may be forged and then finish machined. The axle end piece 140 has a main portion 142 (FIG. 9) with an opening 144 extending completely through the main portion for receiving a central portion of the king pin 62*a*, as illustrated in FIG. 8. The knuckle 24*a* and axle end piece 140 may be manufactured in a complementary manner to support the king pin 62*a* in a substantially vertical orientation or to have a relatively small total negative camber in a range from about 0.5° to about 5.0°. The axle end piece 140 has a plug portion or axle attachment portion 146 that extends from the main portion 142 in a direction transverse to the axis C of the opening 144 and the king pin 62*a*. The axle attachment portion 146 of the axle end piece 140 has an outer periphery that is shaped and sized to be press fit within the end portion of the central tube 50 of the axle 48. In the illustrated example, the axle attachment portion 146 has a substantially cylindrical and solid configuration. The central tube 50 may have surface means defining at least one opening window 148 near an end of the central tube for welding the axle end piece 140 to the central tube of the axle 48 to prevent relative rotation.

A wheel end assembly 150 (FIGS. 1-2) is mounted on the spindle 64*a* as is known. The wheel end assembly 150 includes a bearing assembly with an inboard bearing (not shown) and an outboard bearing (not shown) mounted on the outboard end of spindle 64*a*. A spindle nut assembly (not shown) is threaded onto the outboard end of the spindle 64*a* and secures the bearings in place. A wheel hub 151 is mounted on the inboard and outboard bearings for rotation relative to the spindle 64*a* as is known.

A hub cap 152 is mounted on the outboard end of the wheel hub 151 to close the end of the hub of the wheel end assembly 150. In a typical heavy-duty vehicle wheel configuration, a plurality of threaded fasteners or studs 154 and mating nuts (not shown) are used to mount one tire wheel or rim or a pair of wheels or rims (not shown), depending on specific design considerations of the wheel end assembly 150. A tire (not shown) is mounted on respective ones of the wheels or rims, as is known.

The axle assembly 22*a* for use on a heavy-duty vehicle may have an air disc brake system 160. The air disc brake system 160 (FIGS. 1-2) is operatively connected to the knuckle 24*a* between the axle 48 and the frame members of the heavy-duty vehicle. The air disc brake system 160 includes a rotor 162 mounted for rotation on the wheel hub 151. The rotor 162 has a radially-extending disc portion that is engaged by the brake pads (not shown) in order to slow or stop rotation of the rotor and ultimately stop movement of the heavy-duty vehicle, as is known. The air disc brake system 160 includes a caliper and carrier assembly 164 that is mounted to the torque plate section 66a of the knuckle 24a. The caliper and carrier assembly 164 is attached to the torque plate section 66a of the knuckle 24a by a plurality of fasteners 166 extending through respective openings 168 (FIGS. 3-5 and 7) in the torque plate section. While the self-steering axle/suspension system 20a is illustrated incorporating the air disc brake system 160, the concept of the subject disclosure may apply to other types of brake systems, such as a drum brake system.

Figure 2:
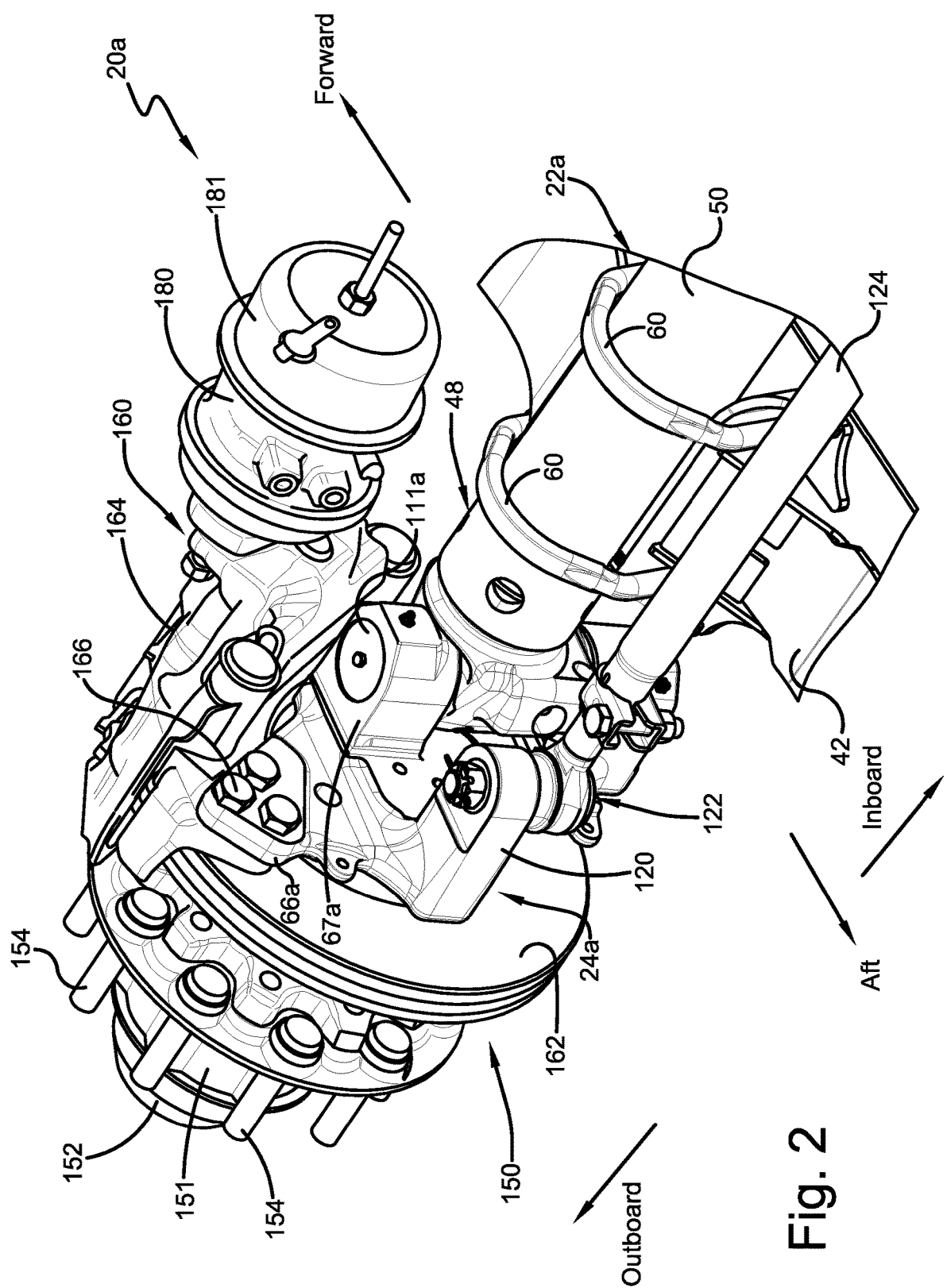
FIG. 2 is an enlarged perspective view from an inboard side of a portion of the self-steering axle illustrated in FIG. 1.

The air disc brake system 160 also includes a brake chamber or actuator 180 for moving the brake pads against the rotor 162. The actuator 180 may or may not include a parking brake chamber 181 (FIGS. 1-2). In the illustrated aspect, the actuator 180 is shown to include the parking brake chamber 181. The actuator 180 typically is in fluid communication with a compressed air source (not shown) of the heavy-duty vehicle and activates to move the brake pads. Because the actuator 180 must be mounted on the inboard side of the knuckle 24a, certain design and available space considerations contribute to where the actuator may be located. This often results in the actuator 180 being located behind and/or beneath the axle 48. This location potentially creates an undesirable clearance between actuator 180 and a ground or road surface. This location can potentially result in the actuator 180 being damaged by hitting the ground or road surface or being struck with road debris. As a result, there is a need for an actuator 180 to be mounted in a manner and location that provides improved protection for the actuator while avoiding contact with components of the heavy-duty vehicle when the axle 48 is lifted or extended to an operating position in which the tires engage the ground or road surface and that may avoid accelerated tire wear and abnormal load conditions on the self-steering axle/suspension system 20a.

The actuator 180 according to one aspect of the subject disclosure is located above and forward of the axle 48. In this location the actuator 180, contact with the ground or road surface is prevented. This location of the actuator 180 also adds some protection by eliminating or minimizing exposure to road splash or debris that may be harmful to the operation and/or service life of the air disc brake system 160.

The actuator 180 extends in an inboard direction away from the knuckle 24a. The actuator 180 pivots proportionately with the pivotal motion of the knuckle 24a. Prior art attempts at locating an actuator similarly have failed because the actuator either came in contact with a hanger, a frame member, an air spring or U-bolts that attach the axle to a trailing arm beam 42 at extreme suspension displacements or during pivotal movement. An important advancement of the concept of the subject disclosure permits locating the actuator 180 above and forward of the axle 48 without contacting the hanger 40, frame members, air springs 44 or U-bolts 60 during pivotal movement of the knuckle 24a.

One way of achieving the improved self-steering axle system 20a is to provide a relief 200 (FIG. 1) in outboard portions of each of the pair of hangers 40 to avoid the parking brake chamber 181 of the actuator 180 contacting a hanger during pivotal movement of the knuckle 24a. It is also the geometry of the spindle 64a relative to the axle 48 that provides clearance for the parking brake chamber 181 of the actuator 180 to clear other structural members of the heavy-duty vehicle. Pivotal movement of the knuckle 24a that may result in the parking brake chamber 181 contacting a hanger 40 without a relief 200 includes when the axle 48 is lifted, when the knuckle is free to pivot and when the parking brake chamber is relatively large.

The longitudinal central axis B (FIGS. 3, 5, 6 and 20) of the spindle 64a is located closer to the top or upper surface 67a of the second arm 102 than it is to the top or upper surface of the first arm 100. For example, the longitudinal central axis B (best seen in FIGS. 6 and 20) of the spindle 64a is located a distance D1 from the top or upper surface 67a of the second arm 102. The longitudinal central axis B of the spindle 64a is located a greater distance D2 from the top or upper surface of the first arm 100. The longitudinal central axis C of the king pin 62a is located transverse to and may be along the longitudinal central axis A of the axle 48. The longitudinal central axis C of the king pin 62a may be offset a distance D3 in a range from about 0.25" to about 2.5" from the longitudinal central axis B of the spindle 64a in the forward direction of the heavy-duty vehicle or alternatively in the range from about 1.5" to about 2.1" and preferably about 1.75". The longitudinal central axis B of the spindle 64a may be located a distance D1 from the top or upper surface 67a of the second arm 102. The longitudinal central axis B of the spindle 64a may be located a distance D2 greater than distance D1 from the top or upper surface of the first arm 100. The distance D1 may be in the range in the range from about 1.2" to about 4.2", alternatively in the range from about 1.8" to about 2.5" and preferably about 2.2". The distance D2 may be in the range in the range from about 3.8" to about 6.8", alternatively in the range from about 5.5" to about 6.2" and preferably about 5.8". The longitudinal mid-point M along axis C of the king pin 62a is spaced below the axis B of the spindle 64a by a distance D6 of at least about 1.3" and spaced below the axis A of the axle 48 by a distance D7 of at least about 0.0". The longitudinal mid-point M along axis C of the king pin 62a is typically located within the main portion 142 of the axle end piece 140.

Structure of the knuckle 24a also has relationships with the axle 48. For example, the longitudinal central axis A of the axle 48 is spaced from the top or upper surface 67a of the second arm 102 a distance D4. The longitudinal central axis A of the axle 48 is also spaced from the top or upper surface of the first arm 100 a distance D5 which is preferably greater than the distance D4 as long as distance D3 remains greater than about 1.5". The distance D4 may be in the range from about 2.7" to about 5.7", alternatively in the range from about 3.3" to about 4.0" and preferably about 3.7". The distance D5 may be in the range in the range from about 2.3" to about 5.3", alternatively in the range from about 4.0" to about 4.7" and preferably about 4.3". Preferably, the sum of the distances D4 and D5 always equal 8". If D4 is increased then D5 is decreased by a comparable amount. Likewise, if D4 is decreased then D5 is increased by a comparable amount. All of this relative geometry is important to the functioning of the self-steering axle/suspension system 20a.

Thus, the structure is said to be a king pin leading arrangement. That is the king pin 62a is located forward of longitudinal central axis B of the spindle 64a, to assist in self-steering and minimizing vibration or oscillation. This geometry is an important feature that enables the actuator 180 of the self-steering axle/suspension system 20a to avoid contact with components of the heavy-duty vehicle, avoid contact with a ground or road surface and minimize exposure to road splash and debris.

The self-steering axle/suspension system 20a with an air disc brake actuator 180 having the knuckle 24a constructed according to at least one aspect of the subject disclosure satisfies the needs of the industry. The disadvantages and drawbacks associated with the prior self-steering axle/suspension systems are overcome with the self-steering axle/suspension system 20a. The new and improved knuckle 24a locates the air disc brake actuator 180 and any associated parking brake chamber 181 in a position that protects them from potential damage from road debris and ground contact and avoids contact with parts of the heavy-duty vehicle during pivotal movement of the knuckle. The new and improved knuckle 24a also has relatively smaller offsets of the king pin from the axle spindle centerline and positions the longitudinal mid-point of the king pin vertically below the axle spindle centerline. It is this geometry that allows the advantageous and protected location of the air disc brake actuator 180 and any associated parking brake chamber 181. The new and improved knuckle 24a also is of a relatively lower weight than prior knuckles used in self-steering axle/suspension systems.

Another self-steering axle/suspension system 20b (FIGS. 10-11) for a heavy-duty vehicle is used to distribute the load carried by the heavy-duty vehicle. The load is distributed when an axle assembly 22b of the self-steering axle/suspension system 20b is in a down or operating position with its associated tires in contact with ground or a road surface. When the heavy-duty vehicle has little or no load or when the heavy-duty vehicle is being backed-up, the axle assembly 22b may be lifted so the tires associated with the axle 48 do not contact ground or a road surface. Raising and lowering of the axle assembly 22b of the self-steering axle/suspension system 20b is accomplished by a known lift mechanism (not shown). The self-steering axle/suspension system 20b includes a new knuckle 24b (FIGS. 10-12 and 15-18) constructed according to an alternate aspect of the subject disclosure.

The heavy-duty vehicle may have more than one self-steering axle/suspension system 20b. By way of example, the heavy-duty vehicle will be described as having a single self-steering axle/suspension system 20b, but it will be apparent that the heavy-duty vehicle may include more than one, as is known.

With respect to the axle assembly 22b (FIGS. 10-11), the majority of the components positioned on one side of the heavy-duty vehicle will have correspondingly similar components positioned on the other side. When reference is made to a particular suspension component, it will be understood that a similar component is present on the opposite side of the heavy-duty vehicle, unless otherwise apparent or stated.

The heavy-duty vehicle typically includes frame members (not shown) extending substantially parallel and longitudinally in a direction of forward and aft movement of the heavy-duty vehicle. A pair of transversely spaced hangers 40 (FIG. 10) are mounted on and depend from the frame members. Each of a pair of transversely spaced apart trailing arm beams 42 are pivotally connected at a forward or first end portion to connect to a respective hanger 40 by a known bushing assembly (not shown), which typically includes a bushing, pivot bolts and washers. Each of a pair of transversely spaced apart trailing arm beams 42 are pivotally connected at a foreword or first end portion to connect to a respective hanger 40 by a known bushing assembly (not shown), which typically includes a bushing, pivot bolts and washers. Each trailing arm beam 42 also includes the rear or second end, which is welded or otherwise rigidly attached to the transversely-extending axle 48. The axle 48 includes an axle central tube 50 extending at least between the trailing arm beams 42. Each one of a pair of shock absorbers 47 may extend between and be mounted on a respective one of the trailing arm beams were 42 and a respective one of the hangers 40.

Each of a pair of transversely spaced air springs 44 are operatively mounted between a respective one of transversely extending frame members at an opposite second end portion 46 of a respective trailing arm beam 42. The air springs 44 provide suspension, and may provide damping, for the axle assembly 22b of the heavy-duty vehicle. Each one of a pair of shock absorbers 47 may extend between and be mounted to a respective one of the trailing arm beams 42 and a respective one of the hangers 40.

Figure 18:
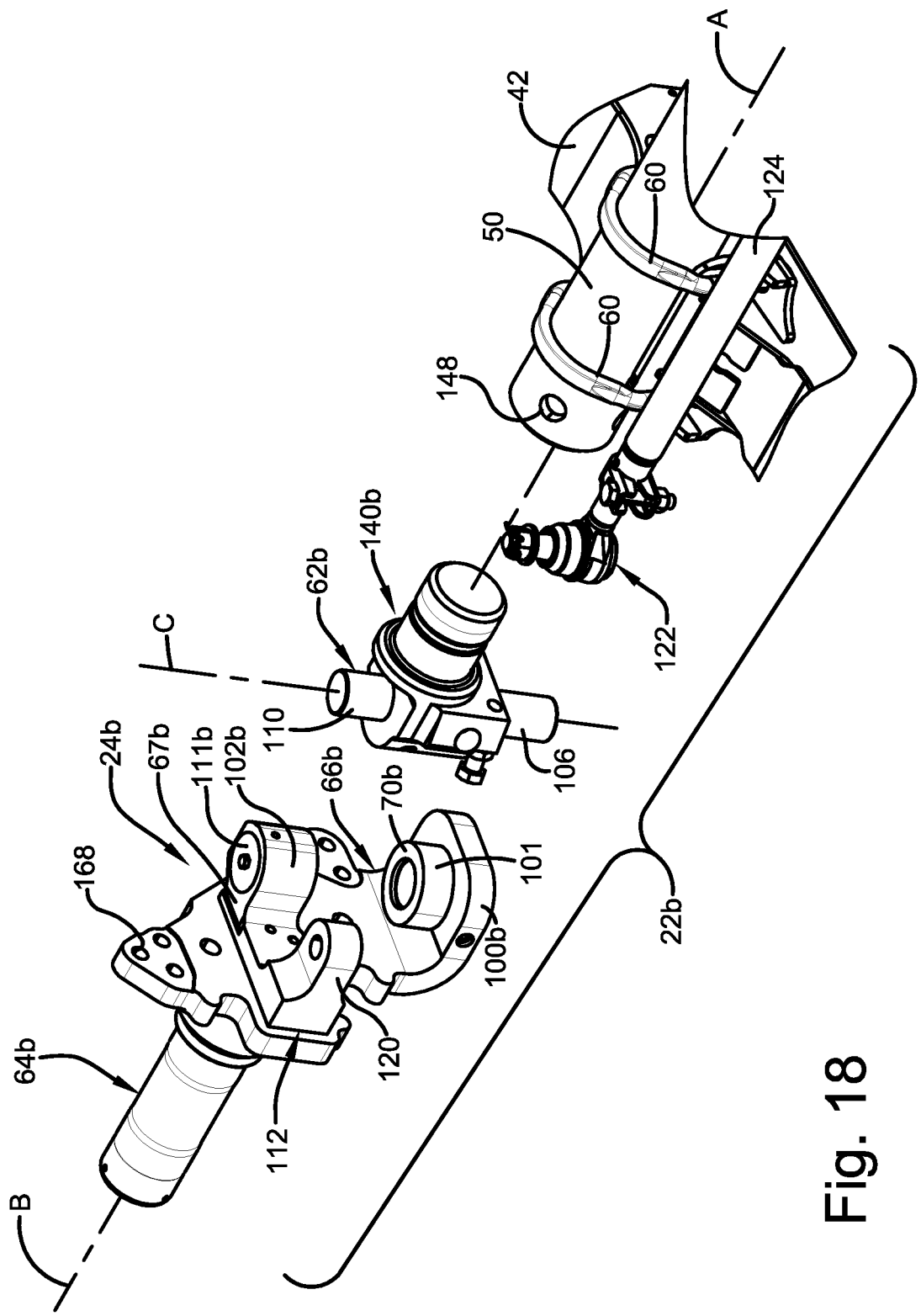
FIG. 18 is an exploded perspective view of a portion of the self-steering axle illustrated in FIG. 12.

The axle assembly 22b also includes an axle 48 with a longitudinal central axis A (FIG. 18). The axle 48 has a central tube 50 and is connected to the trailing arm beams 42 by U-bolts 60 and/or attachment welds, for example, but any suitable attachment arrangement may be used. The axle 48 is pivotal relative to the hangers 40.

A king pin 62b (FIGS. 18 and 20) is connectable with a respective end portion of the axle 48 and has a longitudinal central axis C. The knuckle 24b receives a lower or first portion 106 and an upper or second portion 110 of the respective king pin 62b. The knuckle 24b is pivotal about the king pin 62b in fore and aft directions. The knuckle 24b supports the king pin 62b in a substantially vertical orientation or to have a relatively small total negative camber in a range from about 0.5° to about 5.0°.

The knuckle 24b has a spindle 64b (FIGS. 12, 15-18 and 20) extending in an outboard direction. The spindle 64b has a longitudinal central axis B which extends substantially parallel to the longitudinal central axis A of the axle 48 when the self-steering axle/suspension system 20b has tire and wheel assemblies (not shown) in a straight ahead or non-turning condition. The spindle 64b may pivot in either direction relative to the longitudinal central axis A of the axle 48 of up to about 30°.

Figure 13:
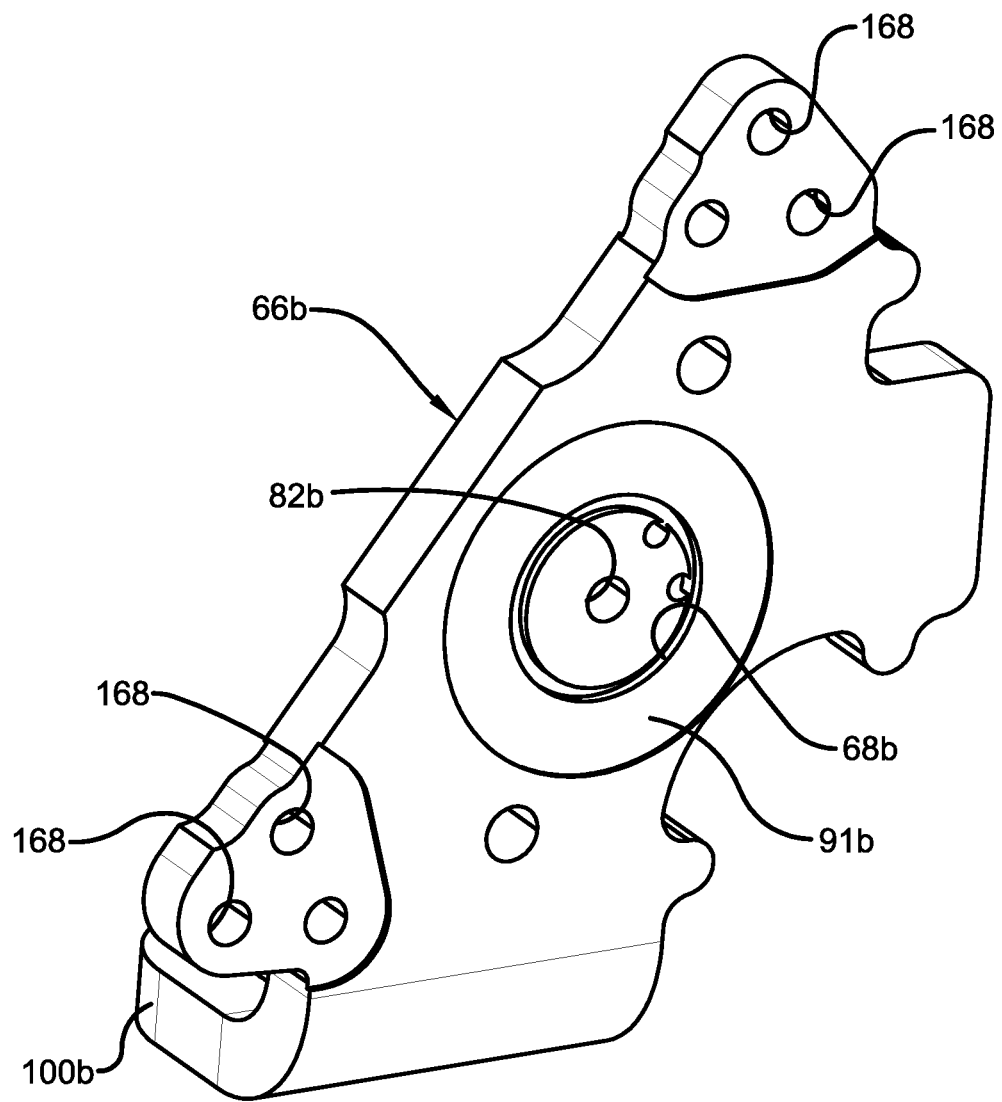
FIG. 13 is a perspective view of a torque plate section of the knuckle illustrated in FIG. 12 and taken from the outboard side.
Figure 14:
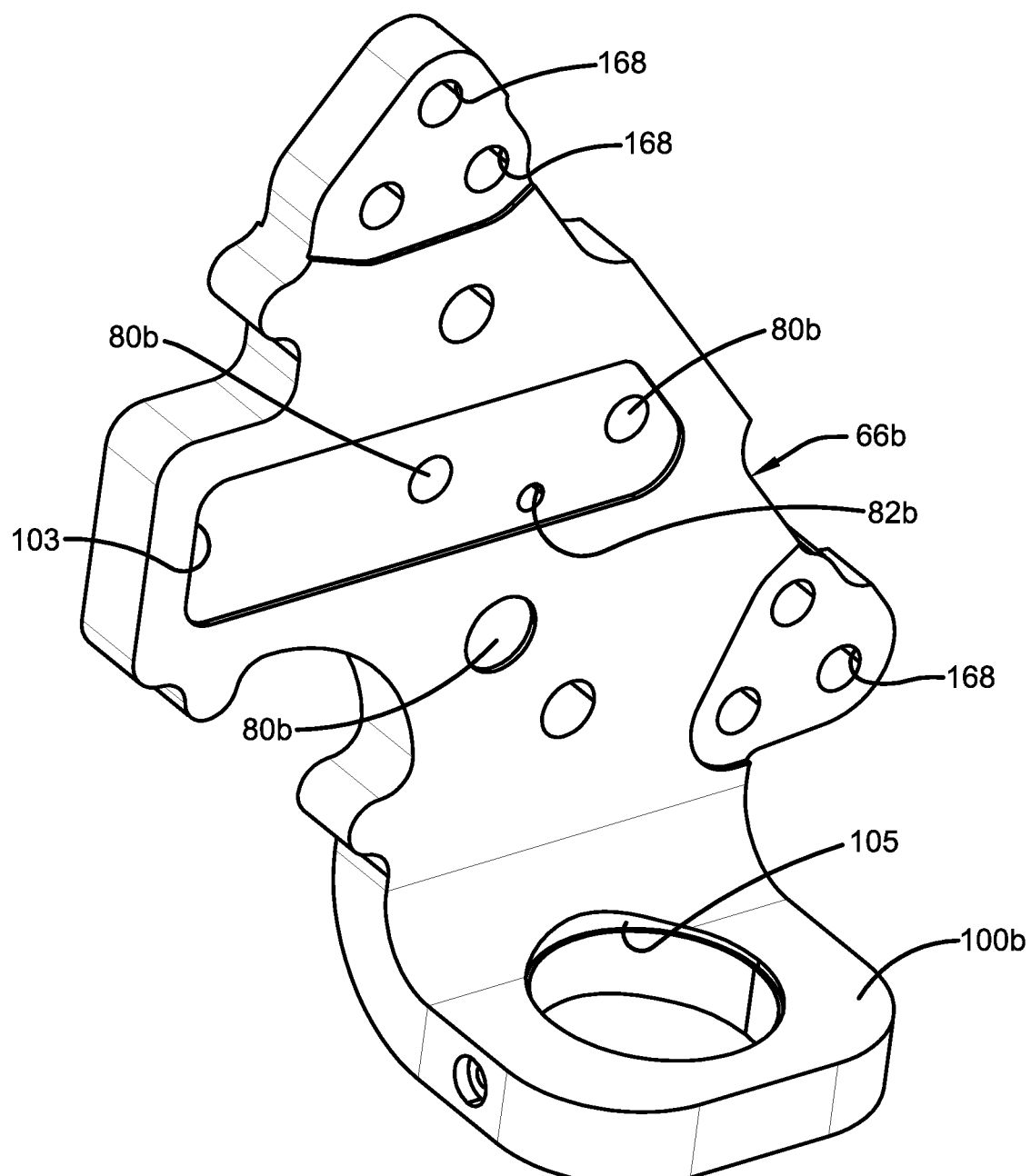
FIG. 14 is a perspective view of the torque plate section of the knuckle illustrated in FIG. 12 and taken from the inboard side.
Figure 15:
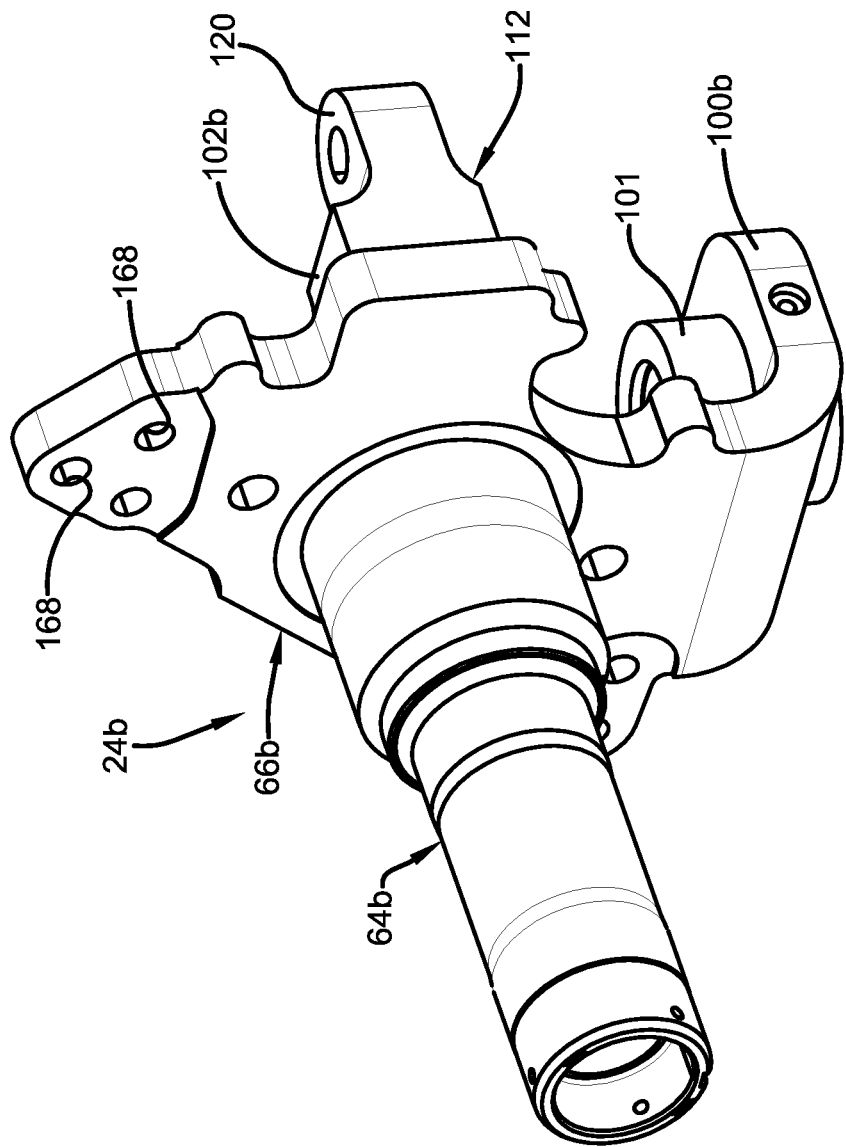
FIG. 15 is a perspective view the knuckle illustrated in FIG. 12 and taken from the outboard side.
Figure 16A:
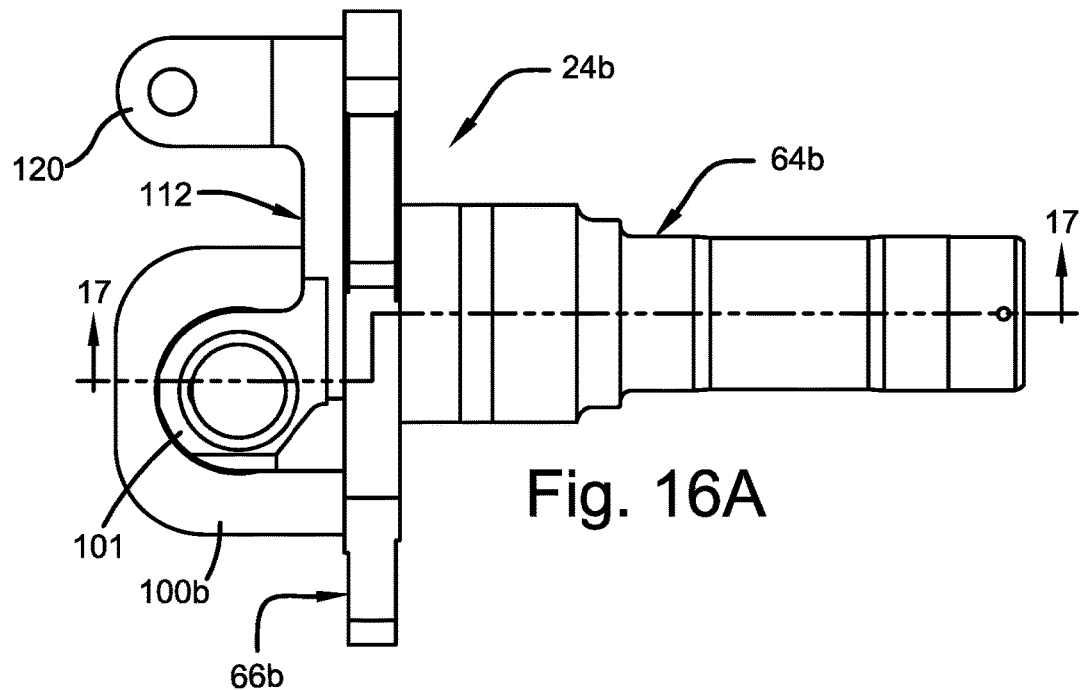
FIG. 16A is a top plan view of the knuckle illustrated in FIG. 16 taken approximately along line 16A-16A in FIG. 16.
Figure 16:
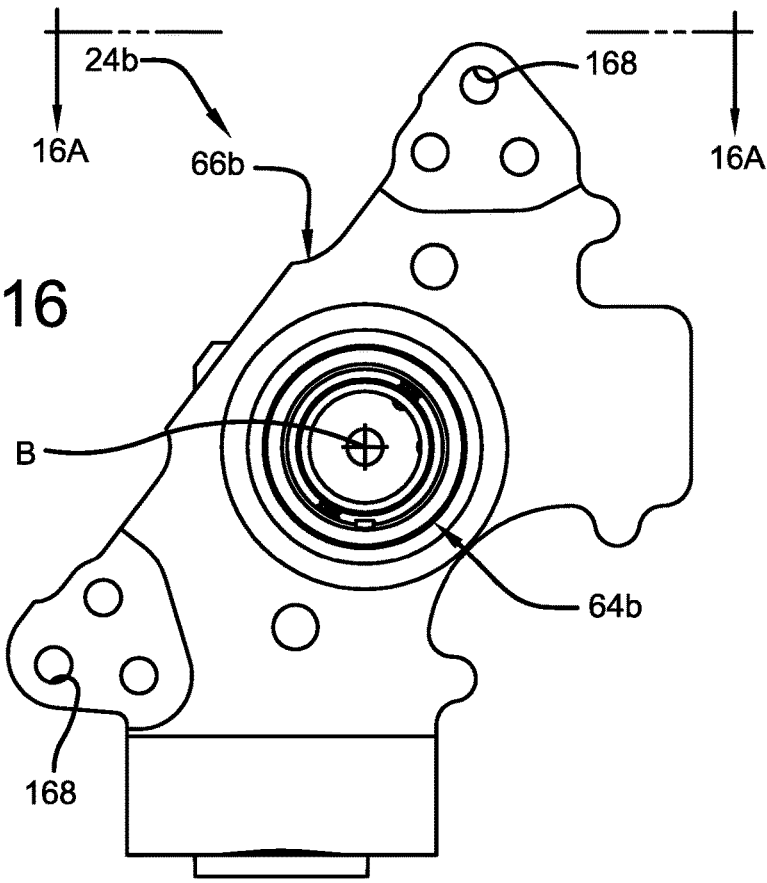
FIG. 16 is an elevational view of the knuckle illustrated in FIG. 15 taken from an outboard side.
Figure 17:
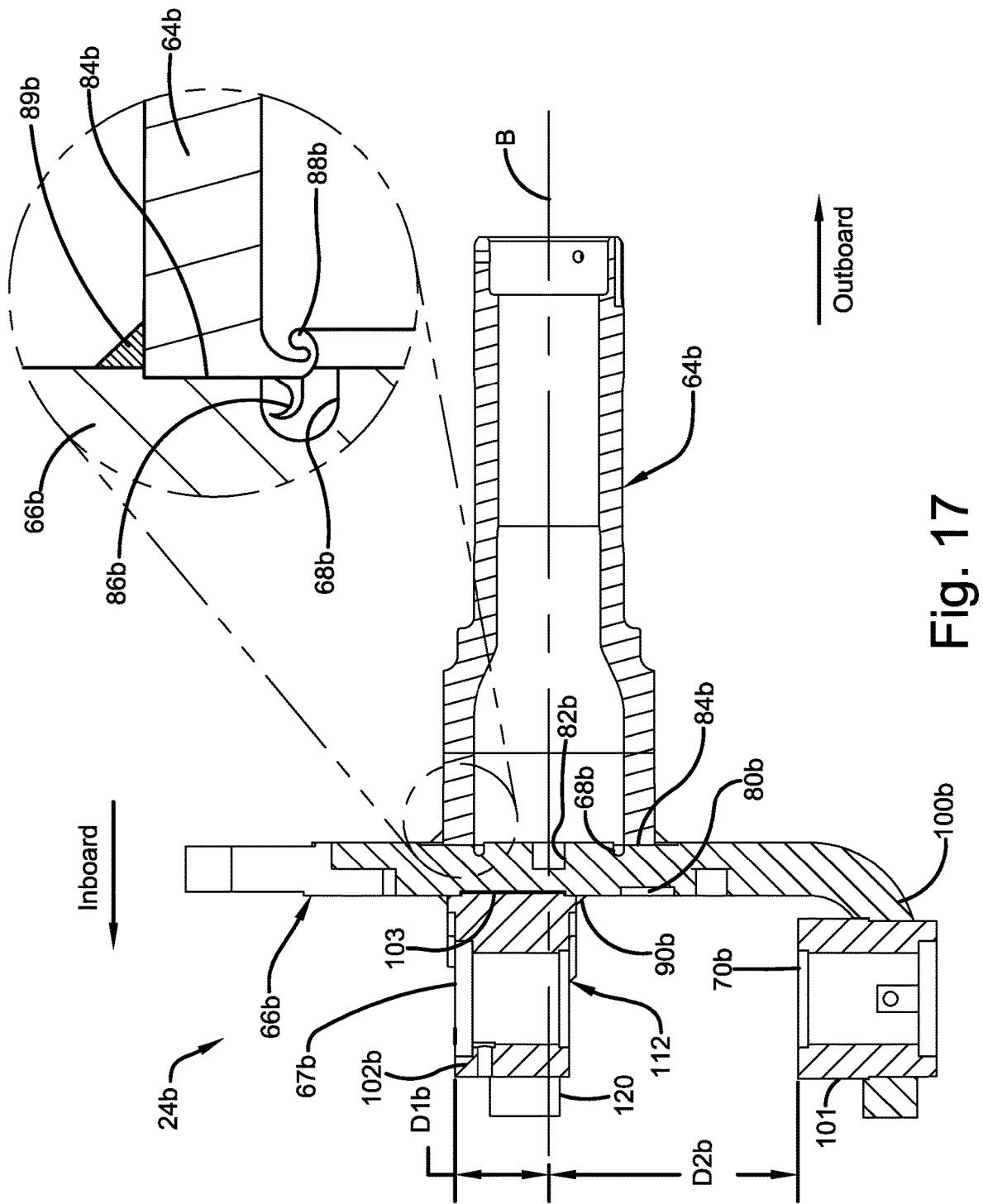
FIG. 17 is a cross-sectional view of the knuckle illustrated in FIGS. 16 and 16A taken approximately along line 17-17 in FIG. 16A, including a greatly enlarged portion of a weld joint.

The knuckle 24b includes a body or torque plate section 66b to which the spindle 64b is fixed by suitable means, such as welding. The spindle 64b may be friction welded to an outboard side of the torque plate section 66b. The torque plate section 66b has at least one manufacturing aid surface 80b (FIG. 14) on an inboard side of the torque plate section that is axially opposite a spindle attachment region 91b. As illustrated in FIG. 14, the manufacturing aid surface 80b may comprise one or more surfaces arranged in the same plane and extend substantially perpendicular to the longitudinal central axis B of the spindle 64b. The surfaces comprising the manufacturing aid surface 80b may have any suitable size and shape. The surfaces making up the manufacturing aid surface 80b are arranged in a pattern on the inboard side of the torque plate section 66b to approximate the size of the attachment region 91b for the spindle 64b which is formed on the outboard side of the torque plate section, as illustrated in FIGS. 13 and 17. The manufacturing aid surface 80b engages a tool during a friction welding operation to rigidly connect the spindle to the torque plate section. The torque plate section 66b may also include a centering or reference opening 82b (FIG. 13) located within the manufacturing aid surfaces 80b that helps position the spindle 64b relative to the torque plate section during a friction welding process.

The torque plate section 66b may have an annular groove 68b (FIG. 13) formed in the outboard side of the torque plate section and may be concentric with centering or reference opening 82b extending through the torque plate section 66b. The annular groove 68b is formed in the torque plate section 66b radially inward of the location at which the spindle 64b is to be welded. As illustrated in FIG. 13, the annular groove 68b is adjacent a weld site 84b (FIG. 17) that is created by the friction welding process. The annular groove 68b provides space for material from the torque plate section 66b to flow into and curl at the inner periphery of the spindle 64b that results from the friction welding process.

The torque plate section 66b has a relatively small weld flash or curl 86b resulting from the friction welding operation that extends into the annular groove 68b. Good shaped and relatively even curls 88b (only one of which is shown in FIG. 17) are created on the inner and outer peripheries of spindle 64b at the weld site 84b during the friction welding process. The curl that is located at the outer periphery of the spindle 64b at the torque plate section 66b preferably is machined away. A fillet weld 89b is then formed on the outer periphery of the spindle 64b at the torque plate section 66b to increase section modulus at the interface of the spindle and torque plate section. The increased section modulus reduces strain at the interface to protect the integrity of the friction weld. The curls 86b and 88b on the inner periphery of the spindle 64b and torque plate section 66b do not interfere with the operation of the knuckle 24b or impact the strength and longevity of the knuckle. The curl 86b of the torque plate section 66b flows into the annular groove 68b to assist with the creation of a good weld adhesion. The torque plate section 66b also may have one or more fillet welds 90b attaching components, such as second arm 102b.

The torque plate section 66b of the knuckle 24b according to this aspect of the subject disclosure may be fabricated from steel plate that is preferably at least 0.75" thick. A first arm 100b (FIGS. 12, 14-15 and 17-18) is integrally formed with the torque plate section 66b by bending to extend transversely to the torque plate section preferably at about 90°. A second arm 102b (FIGS. 11-12 and 17-18) is formed separately from the torque plate section 66b and first arm 100b by machining a piece or block 112 of steel. The outer periphery of the second arm 102b is shaped and sized to be positioned and captured within a machined notch 103 in the torque plate section. The second arm 102b is attached to the torque plate section 66b by suitable means, such as welding. The first arm 100b receives a boss 101 that may be fastened or welded to the first arm in recess 105. The boss 101 has an opening 104 (FIG. 12) for receiving a lower or first end portion 106 of the king pin 62b. The second arm 102b has another boss with an opening 108 that is coaxially aligned with the opening 104 in the boss 101 of the first arm 100b for receiving an upper or second end portion 110 of the king pin 62b. An upper or outermost surface of a cap 111b (FIG. 11) may be substantially flush with the upper surface 67b of the second arm or spaced slightly from the end of the opening 108. The cap 111b (FIG. 18) may seal the upper end of the opening 108 in the second arm 102b to protect the king pin 62b and knuckle 24b from contaminants from the environment in which the heavy-duty vehicle operates.

Tie rod attachment structure 120 is integrally formed on the same block 112 of steel as the second arm 102b by machining. The tie rod attachment structure 120 supports a tie rod end 122 of tie rod 124 at a ball and socket arrangement of the tie rod end. The center CB (FIG. 20) of the ball of the tie rod end 122 and a longitudinal central axis of the tie rod 124 are located within a horizontal plane HP that contains the longitudinal central axis A of the axle 48 when the wheels and tires of the heavy-duty vehicle are in the straight-ahead or non-steered positions.

Figure 19:
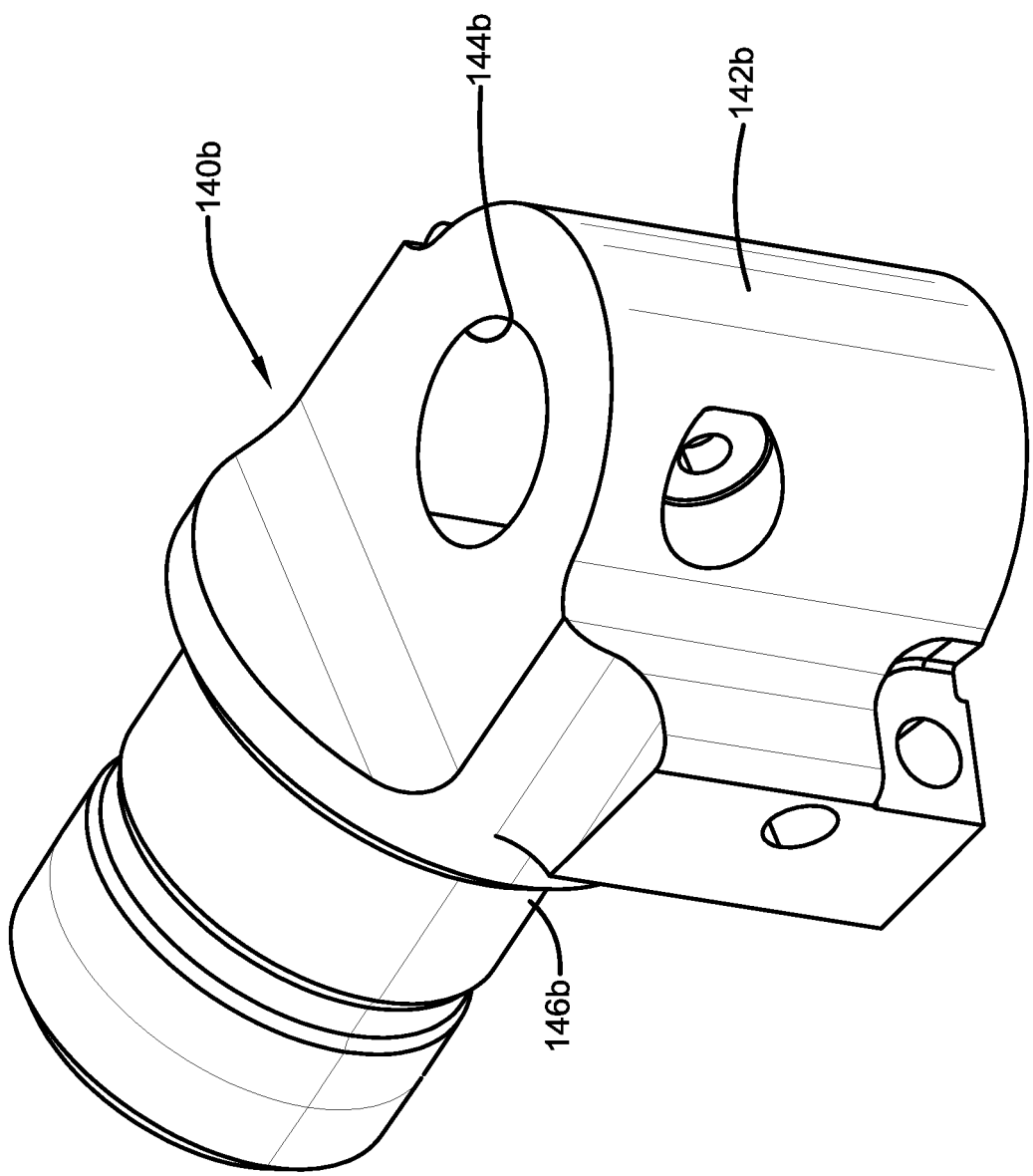
FIG. 19 is an enlarged perspective view of an axle end piece that is illustrated in FIG. 18.

The king pin 62b is attached to a respective end portion of the central tube 50 by an axle end piece 140b (FIGS. 18-19). The axle end piece 140b may be entirely machined from steel. The axle end piece 140b has a main portion 142b (FIG. 19) with an opening 144b extending completely through the main portion for receiving a central portion of the king pin 62b, as illustrated in FIG. 18. The axle end piece 140b has an axle attachment portion 146b that extends from the main portion 142b in a direction transverse to a central axis C of the opening 144b and king pin 62b. The axle attachment portion 146b of the axle end piece 140b has an outer periphery that is shaped and sized to be press fit within the end portion of the central tube 50 of the axle 48. In the illustrated example, the axle attachment portion 146b has a substantially cylindrical and solid configuration. The central tube 50 may have surface means defining at least one opening window 148 near an end of the central tube for welding the axle attachment portion 146b of the axle end piece 140b to the central tube of the axle 48.

The longitudinal central axis B of the spindle 64b is located closer to the second arm 102b than it is to the first arm 100b, as illustrated in FIGS. 17 and 20. Since the geometries of the knuckles 24a and 24b are the same, reference numerals shown in FIG. 20 do not have a letter suffix "a" or "b" associated with the similar components.

A wheel end assembly 150 (FIGS. 10-11) is mounted on the spindle 64b. For the purposes of convenience and clarity, only one knuckle 24b and its respective wheel end assembly 150 will be described. The wheel end assembly 150 includes a bearing assembly with an inboard bearing (not shown) and an outboard bearing (not shown) mounted on the outboard end of the spindle. A spindle nut assembly (not shown) is threaded onto the outboard end of the spindle 64b and secures the bearings in place. A wheel hub 151 is mounted on the inboard and outboard bearings for rotation relative to the spindle 64b, as is known.

A hub cap 152 is mounted on the outboard end of the wheel hub to close the end of the hub of the wheel end assembly 150. In a typical heavy-duty vehicle wheel configuration, a plurality of threaded fasteners or studs 154 and mating nuts (not shown) are used to mount one tire rim or a pair of wheels or rims (not shown), depending on specific design considerations, on the wheel end assembly 150. A tire (not shown) is mounted on respective ones of the wheels or rims, as is known.

The wheel end assembly 150 includes an air disc brake system 160 (FIGS. 10-11) that is attached to the knuckle 24b between the axle 48 and the frame members of the heavy-duty vehicle. The air disc brake system 160 includes a rotor 162 mounted for rotation on the wheel hub 151. The rotor 162 has a radially-extending disc portion that is engaged by the brake pads (not shown) in order to slow or stop rotation of the rotor and ultimately stop movement of the heavy-duty vehicle, as is known. The air disc brake system 160 includes a caliper and carrier assembly 164 that is mounted to the torque plate section 66b of the knuckle 24b. The caliper and carrier assembly 164 is attached to the torque plate section 66b of the knuckle 24b by a plurality of fasteners 166 extending through respective openings 168 (FIGS. 12-16 and 18) in the torque plate section. While the self-steering axle/suspension system 20b is illustrated incorporating the air disc brake system 160, the concept of the subject disclosure may apply to other types of brake systems, such as a drum brake system.

Figure 10:
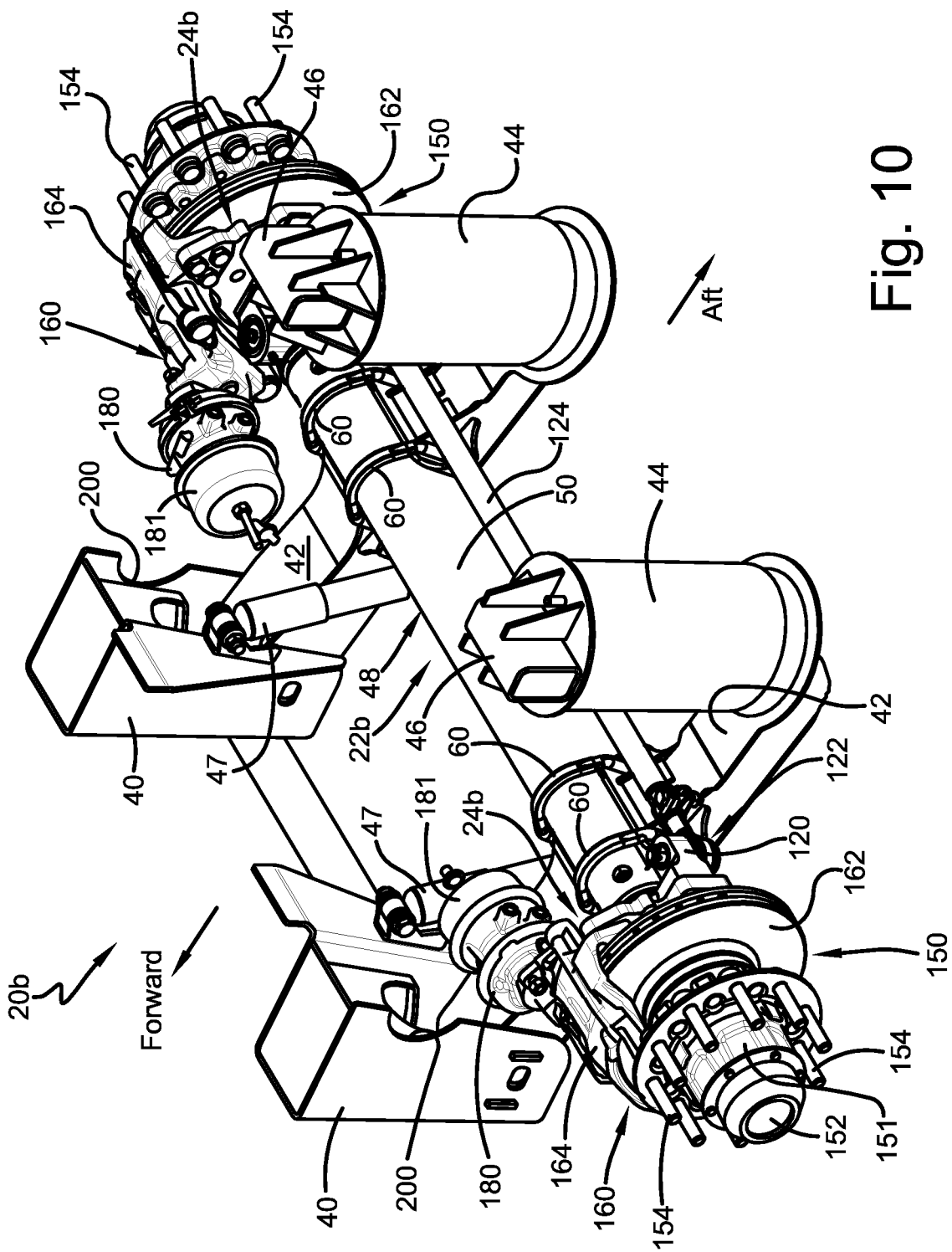
FIG. 10 is an overall top perspective view of a self-steering axle incorporating a knuckle constructed according to another aspect of the subject disclosure.
Figure 11:
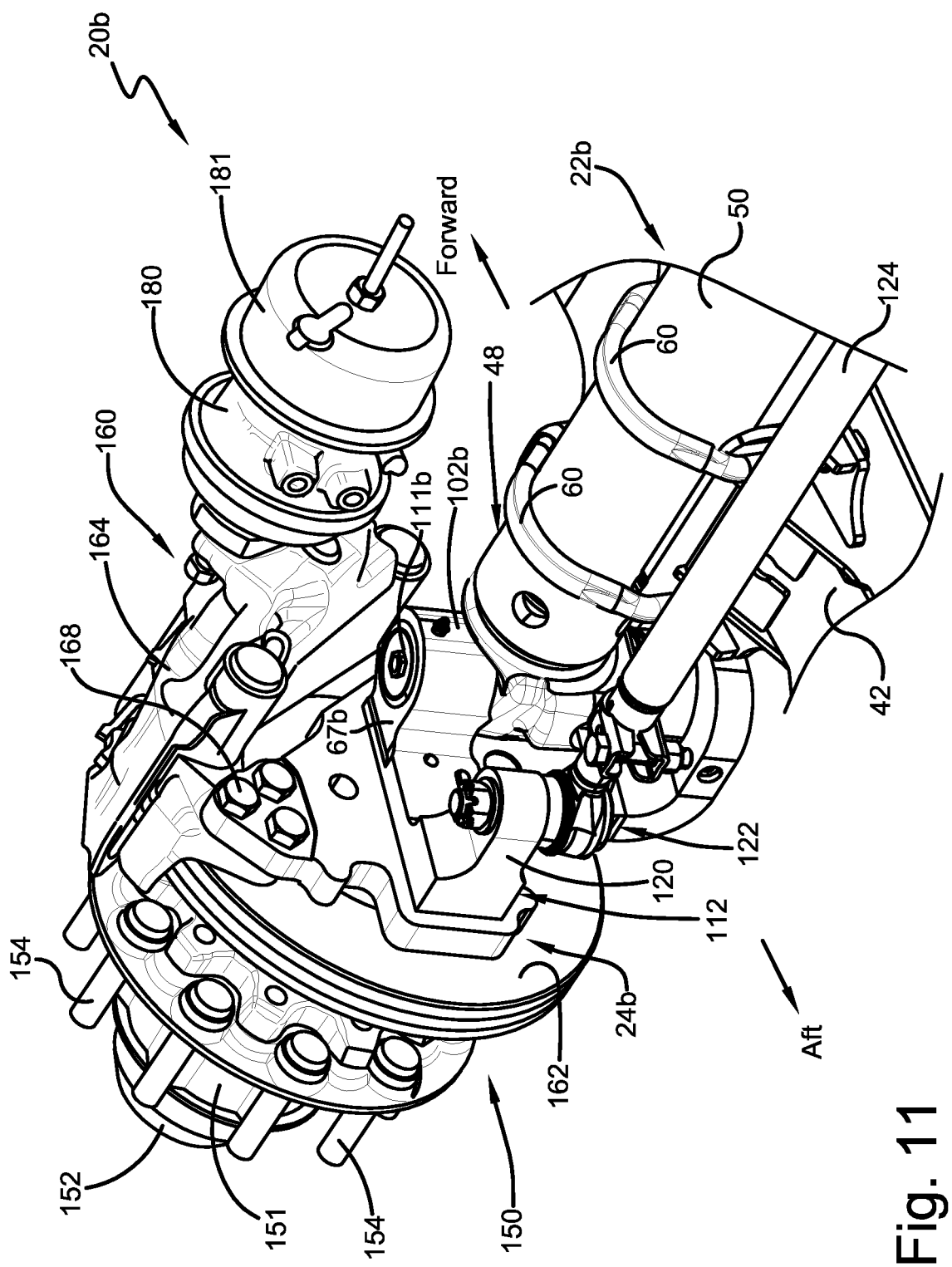
FIG. 11 is an enlarged perspective view from an inboard side of a portion of the self-steering axle illustrated in FIG. 10.
Figure 12:
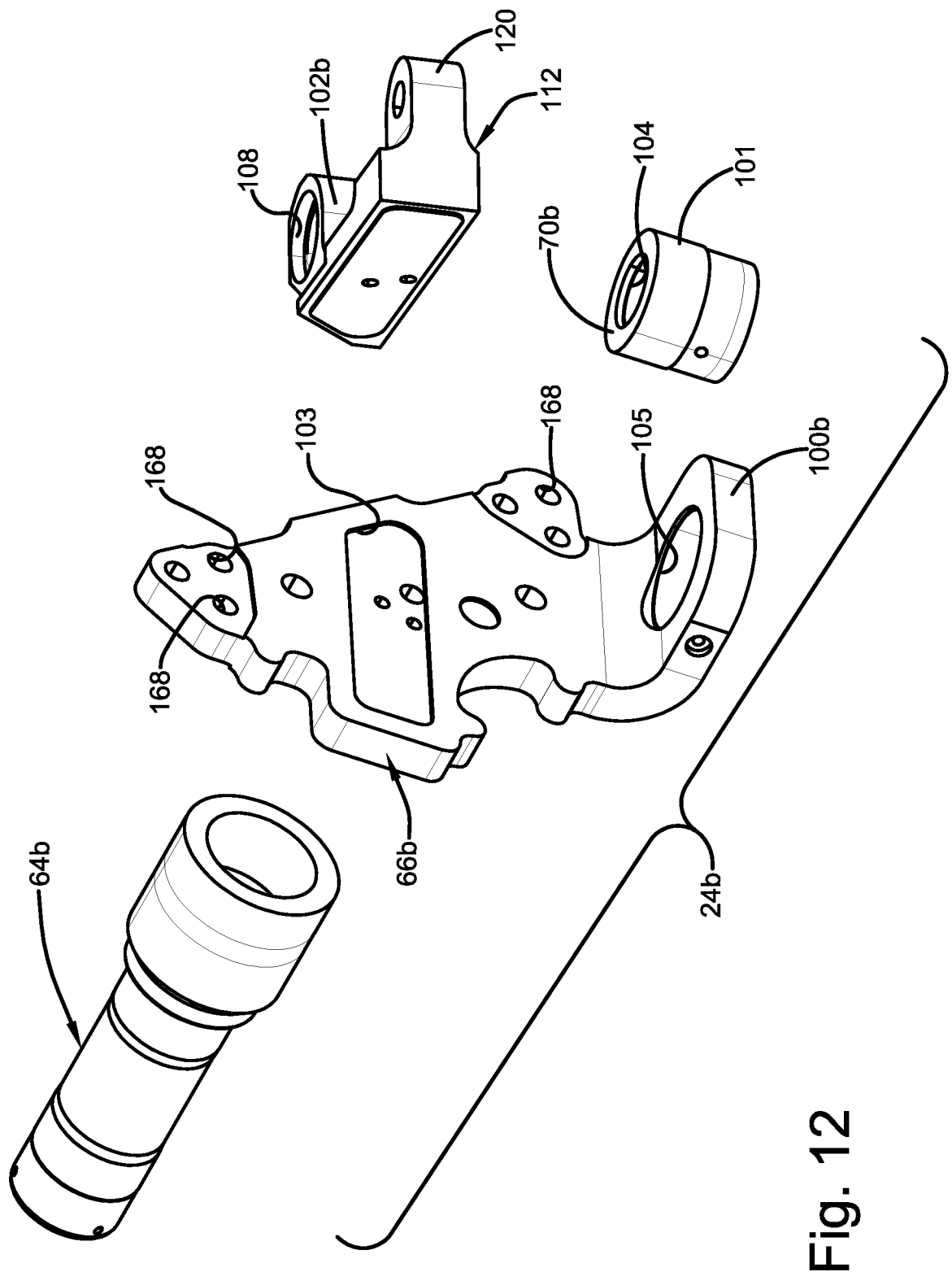
FIG. 12 is an exploded perspective view of the knuckle illustrated in FIGS. 10-11 and taken from the inboard side.

The air disc brake system 160 also includes a brake chamber or actuator 180 for moving the brake pads against the rotor 162. The actuator 180 may or may not include a parking brake chamber 181 (FIGS. 10 and 11). In the illustrated aspect, the actuator includes the parking brake chamber 181. The actuator 180 typically is in fluid communication with a compressed air source (not shown) of the heavy-duty vehicle and activates to move the brake pads into engagement with the rotor 162. Because the actuator 180 must be mounted on the inboard side of the knuckle 24b, certain design and available space considerations contribute to where the actuator may be located. This often results in a prior art actuator being located behind and/or beneath the axle 48. This location potentially creates a relatively small clearance between prior art actuator and the ground or road surface. This location may result in the prior art actuator being damaged by hitting the ground or road surface or of being struck with road splash or debris. As a result, there is a need for an actuator 180 to be mounted in a manner and location that provides improved protection for the actuator while avoiding contact with components of the heavy-duty vehicle when the axle 48 is lifted or the tires turning and that may avoid accelerated tire wear and abnormal load conditions on the axle assembly 22b of the self-steering axle/suspension system 20b.

The actuator 180 according to this aspect of the subject disclosure is also positioned above the trailing arm beam 42 and forward of the axle 48, as illustrated in FIGS. 10-11. This position of the actuator 180 protects it from contacting a ground or road surface and adds some protective measures by eliminating or minimizing exposure to road splash or debris all of which may be harmful to the operation and/or service life of the air disc brake system 160.

The actuator 180 extends in an inboard direction away from the knuckle 24b. The actuator 180 pivots proportionately with the pivotal motion of the knuckle 24b. Prior art attempts at positioning an actuator above an axle of a self-steering axle system have failed. These attempts have failed because the actuator contacted a hanger, a frame member, an air spring or U-bolts that attach the axle to a trailing arm beam 42 at extreme suspension displacements during pivotal movement. An important advancement of the concept of the subject disclosure permits locating the actuator 180 above and forward of the axle 48 without contacting the hanger 40, frame members, air springs 44 or U-bolts 60 during pivotal movement of the knuckle 24b.

One way of achieving the improved self-steering axle/suspension system 20b is to provide a relief 200 (FIG. 10) in outboard portions of each of the pair of hangers 40 to avoid the actuator 180 and/or the parking brake chamber 181 of the actuator 180 contacting a hanger during pivotal movement of the knuckle 24b. It is also the geometry of the spindle 64b relative to the longitudinal axis of the axle 48 that provides clearance for the parking brake chamber 181 of the actuator 180 to clear other structural members of the heavy-duty vehicle. Pivotal movement of the knuckle 24b that may result in the parking brake chamber 181 contacting a hanger 40 without a relief 200 includes when the axle 48 is lifted and the knuckle is free to pivot and/or when the parking brake chamber is relatively large.

The longitudinal central axis B of the spindle 64b is located closer to the top or upper surface 67b of the second arm 102b than it is to the top or upper surface 70b of the boss 101 mounted to the first arm 100b. For example, the longitudinal central axis B (best seen in FIGS. 17 and 20) of the spindle 64b is located a distance D1b from the top or upper surface 67b of the second arm 102. The longitudinal central axis B of the spindle 64b is located a greater distance D2b from the top or upper surface 70b of the boss 101 mounted in the first arm 100b than the distance D1b. The longitudinal central axis B of the spindle 64b is located aft from the longitudinal central axis A of the axle 48 or the longitudinal central axis C of the king pin 62b a distance D3 (FIG. 20) in the range from about 0.25" to about 2.50", or alternatively in the range from about 1.5" to about 2.1" and preferably about 1.75". The longitudinal central axis C of the king pin 62b is located transverse to and may be along the longitudinal central axis A of the axle 48. The longitudinal central axis C of the king pin 62b may be offset in a range from about 0.25" to about 2.5" from the longitudinal central axis B of the spindle 64a in the forward direction of the heavy-duty vehicle. The longitudinal central axis B of the spindle 64b may be located a distance D1b to the top or upper surface 67b of the second arm 102. The longitudinal central axis B of the spindle 64b may be located a distance D2b greater than distance D1b from the top or upper surface 70b of the boss 101 mounted to the first arm 100. The distance D1b may be in the range in the range from about 1.2" to about 4.2", alternatively in the range from about 1.8" to about 2.5" and preferably about 2.2". The distance D2b may be in the range from about 3.8" to about 6.8", alternatively in the range from about 5.5" to about 6.2" and preferably about 5.8".

Structure of the knuckle 24b also has relationships with the axle 48. For example, the longitudinal central axis A of the axle 48 is spaced from the top or upper surface 67b of the second arm 102 a distance D4. The longitudinal central axis A of the axle 48 is also spaced from the top or upper surface 70b of the boss 101 mounted to the first arm 100 a distance D5 which is preferably greater than the distance D4. The distance D4 may be in the range in the range from about 2.7" to about 5.7", alternatively in the range from about 3.3" to about 4.0" and preferably about 3.7". The distance D5 may be in the range in the range from about 2.3" to about 5.3", alternatively in the range from about 4.0" to about 4.7" and preferably about 4.3". All of this relative geometry is important to the functioning of the self-steering axle/suspension system 20b and the axle assembly 22b. This geometry is also an important feature that enables the self-steering axle/suspension system 20b to avoid contact with components of the heavy-duty vehicle and protect the actuator 180 from contact with a ground or road surface and minimize exposure to road splash and debris.

The self-steering axle/suspension system 20b with an air disc brake actuator 180 having the knuckle 24b constructed according to at least one aspect of the subject disclosure satisfies the needs of the industry. The limitations, disadvantages and drawbacks associated with the prior self-steering axle/suspension systems are overcome with the self-steering axle/suspension system 20b constructed and manufactured according to the subject disclosure. The new and improved knuckle 24b locates the air disc brake actuator 180 and any associated parking brake chamber 181 in a position that protects them from potential damage from road debris and ground contact and that avoids contact with parts of the heavy-duty vehicle during pivotal movement of the knuckle. The new and improved knuckle 24b also has relatively smaller offsets of the king pin from the axle spindle centerline and positions the longitudinal mid-point of the king pin vertically below the axle spindle centerline. It is this geometry that allows the advantageous and protected location of the air disc brake actuator 180 and any associated parking brake chamber 181. The new and improved knuckle 24b also is of a relatively lower weight than prior knuckles used in self-steering axle/suspension systems.

Thus, the limitations, disadvantages and drawbacks associated with the prior self-steering axle/suspension systems are overcome with the self-steering axle/suspension system 20a, 20b constructed and manufactured according to the subject disclosure. The self-steering axle/suspension system 20a, 20b with an air disc brake actuator 180 having the knuckle 24a, 24b constructed according to at least one aspect of the subject disclosure satisfies the needs of the industry. The concepts of the subject disclosure provide a self-steering axle/suspension system 20a, 20b for a heavy-duty vehicle that can provide improved protection for the air disc brake system actuator 180 by positioning it without contacting components of the heavy-duty vehicle.

The knuckle 24a, 24b for mounting the air disc brake actuator 180, according to the subject disclosure, provides a support of the actuator in a relatively protected location when compared to prior art actuators. This location also may allow the use of relatively shorter supply lines for the air and contribute to lowering the weight of the heavy-duty vehicle. The air supply lines for the air disc brake system 160 are also mounted relatively higher which potentially better protects the air supply lines from damage by road splash and debris.

Moreover, as opposed to a prior art brake chamber that is located behind and/or beneath the axle/suspension system beam, the knuckle 24a, 24b of the subject disclosure enables the actuator 180 to be located above and forward of the axle 48, thereby providing a protected location and increased clearance between the brake chamber and the ground. Such increased clearance reduces the chance that the actuator 180 may be damaged by hitting the ground or road surface or being struck with road debris. The knuckle 24a, 24b for mounting the air disc brake actuator 180 is mounted in a manner and location that provides improved protection for the actuator while avoiding contact with components of the heavy-duty vehicle when the axle 48 is lifted or the tires are turning to avoid accelerated tire wear and abnormal load conditions on the axle assembly 22a, 22b. The new and improved knuckle 24a, 24b also is of a relatively lower weight than knuckles used in prior self-steering axle/suspension systems.

It is to be understood that the structure and arrangement of the above-described knuckle 24a, 24b of the subject disclosure may be altered or rearranged without affecting the overall concept or operation of the subject disclosure. In addition, the knuckle 24a, 24b of the subject disclosure may be employed with other types of axles, wheel end assemblies, axle/suspension systems, and/or brake systems than those shown and described above, without affecting the overall concept, function or operation of the subject disclosure. While the self-steering axle system 20a, 20b is illustrated incorporating the air disc brake system, the concept of the subject disclosure may apply to other types of brake systems, such as a drum brake system. Moreover, while reference herein has been made generally to a heavy-duty vehicle for the purpose of convenience, it has been with the understanding that such reference includes trucks, tractor-trailers and semi-trailers, and trailers thereof.

The subject disclosure has been described with reference to specific aspects. It is understood that this description and illustration is by way of example and not by way of limitation. Potential modifications and alterations will occur to others upon a reading and understanding of this disclosure, and it is understood that the subject disclosure includes all such modifications and alterations and equivalents thereof. The features, discoveries and principles of the subject disclosure, the manner in which the knuckle 24a, 24b is constructed, arranged and used, the characteristics of the construction and arrangement, and the advantageous, new and useful results obtained; are by way of example and not limitation.

The subject disclosure successfully incorporates a new knuckle configuration into a self-steering axle/suspension system for heavy-duty vehicles. Accordingly, the improved knuckle allows the positioning of an air disc brake actuator in a location that eliminates or minimizes the limitations, difficulties, disadvantages and/or drawbacks encountered with prior art self-steering axle systems by protecting the actuator from road splash and debris without contacting other components of the heavy-duty vehicle.

What is claimed is:

1. A self-steering axle/suspension system for use with a heavy-duty vehicle having frame members and an air disc brake system, the self-steering axle system comprising:
    a pair of laterally spaced apart hangers, each hanger mounted to a respective one of the frame members of the heavy-duty vehicle;
    a pair of laterally spaced apart trailing arm beams, each trailing arm beam pivotally connected at a first end portion to a respective hanger;
    a pair of laterally spaced apart air springs, each air spring operatively mounted between a respective one of the frame members and an opposite second end portion of a respective trailing arm beam;
    an axle having a central tube with a longitudinal central axis, the axle supported by the trailing arm beams;
    a pair of king pins, each king pin connectable with a respective end portion of the axle;
    a pair of knuckles, each knuckle connectable with a respective one of the king pins and being pivotal about the king pin, each knuckle including:
        a torque plate section;
        a first arm extending transversely from the torque plate section, the first arm for receiving a first end portion of therespective one of the king pins;
        a second arm extending transversely from the torque plate section in the same direction as the first arm, the second arm for receiving an opposite second end portion of the respective one of the king pins; and
        a spindle welded to an outboard surface of the torque plate section, the spindle having a longitudinal central axis;
    a pair of actuators of the air disc brake system, each actuator mounted to a respective knuckle between the axle and the frame members of the heavy-duty vehicle and extending from the knuckle in an inboard direction; and
    a relief formed in each of the pair of hangers to avoid contact with an actuator during pivotal movement of the knuckles.

2. The self-steering axle/suspension system of claim 1 wherein the actuator being proportionately pivotal with pivoting movement of the knuckle without contacting an air spring.

3. The self-steering axle/suspension system of claim 1 wherein the relief is positioned and sized to avoid contact by the actuator during pivotal movement of the spindle up to about 30° in either direction from the longitudinal central axis of the central tube of the axle.

4. The self-steering axle/suspension system of claim 1 further including an axle end piece receivable in an opening in the end portion of the central tube, the axle end piece having a first portion with an opening for receiving a portion of the king pin located between the first and second end portions of the king pin, the axle end piece also having a plug portion extending from the first portion in a direction transverse to the opening in the first portion, the plug portion having an outer surface closely fitting within the central tube of the axle, the central tube of the axle having at least one window opening for welding the plug portion to the central tube.

5. The self-steering axle/suspension system of claim 1 further including the torque plate section having at least one surface on an inboard side of the torque plate section, and wherein the at least one surface is substantially planar and extends substantially perpendicular to the longitudinal central axis of the spindle.

6. The self-steering axle/suspension system of claim 1 wherein at least the torque plate section is formed by forging.

7. The self-steering axle/suspension system of claim 6 further including tie rod attachment structure wherein the first arm, the second arm and the tie rod attachment structure are integrally formed as one piece with the torque plate section by forging.

8. The self-steering axle/suspension system of claim 1 wherein the king pin is cylindrical with a longitudinal central axis, a midpoint along the longitudinal central axis of the king pin being is spaced from the centerline of the spindle in a direction of the first arm.

9. A self-steering axle assembly for use on a heavy-duty vehicle having an air disc brake system, the self-steering axle assembly comprising:
an axle having a central tube with a longitudinal central axis;
a trailing arm beam mounted for pivotal movement and connected to the axle;
a king pin connected with an end portion of the central tube, the king pin having a longitudinal central axis;
a knuckle connectable with the king pin, the knuckle being pivotal about the king pin, the knuckle including:
a torque plate section;
a first arm extending from an inboard surface of the torque plate section, the first arm having an opening for receiving a first end portion of the king pin;
a second arm extending from the torque plate section in the same direction that the first arm extends, the second arm having an opening coaxially aligned with the opening in the first arm for receiving an opposite second end portion of the king pin;
a spindle fixed to and extending from an outboard surface of the torque plate section, the spindle having a longitudinal central axis; and
the longitudinal central axis of the king pin intersecting the longitudinal central axis of the axle;
the longitudinal central axis of the king pin being spaced from the longitudinal central axis of the spindle in a direction of forward travel of the heavy-duty vehicle by no more than about 2.5 inches;
the longitudinal mid-point of the longitudinal central axis of the king pin being spaced below the longitudinal central axis of the central tube by no more than about 2.93 inches; and
an actuator of the air disc brake system mounted above the trailing arm beam and forward of the axle.

10. The self-steering axle assembly of claim 9 wherein the torque plate section, the first arm and the second arm, are integrally formed as one-piece by forging.

11. The self-steering axle assembly of claim 9 further including a tie rod attachment connectable with a tie rod end at a ball and socket joint of the tie rod end, the center of the ball of the tie rod end is located the same distance from the first arm in a direction parallel to the longitudinal central axis of the king pin as the longitudinal central axis of the axle is located from the first arm when wheels associated with the axle are in substantially straight-ahead positions.

12. The self-steering axle assembly of claim 9 further including a relief formed in each of a pair of hangers of the heavy-duty vehicle to prevent contact of the actuator of the air disc brake system with a hanger during pivotal movement of the knuckle.

13. The self-steering axle assembly of claim 12 wherein the relief in the hanger is positioned and sized to avoid contact by the actuator of the air disc brake system during pivotal movement of the spindle up to about 30° relative to the longitudinal central axis of the axle.

14. The self-steering axle assembly of claim 9 wherein the actuator of the air disc brake system avoids contact with the axle during pivotal movement of the spindle up to about 30° relative to the longitudinal central axis of the axle.

* * * * *